(12) United States Patent
Yoon et al.

(10) Patent No.: US 11,793,695 B2
(45) Date of Patent: Oct. 24, 2023

(54) MULTIFUNCTION TOILET WHEELCHAIR

(71) Applicant: University of Washington, Seattle, WA (US)

(72) Inventors: Woon Jong Yoon, Seattle, WA (US); Sang-gyeun Ahn, Seattle, WA (US)

(73) Assignee: University of Washington, Seattle, WA (US)

( * ) Notice: Subject to any disclaimer, the term of this patent is extended or adjusted under 35 U.S.C. 154(b) by 487 days.

(21) Appl. No.: 16/911,246

(22) Filed: Jun. 24, 2020

(65) Prior Publication Data

US 2020/0405552 A1 Dec. 31, 2020

Related U.S. Application Data

(60) Provisional application No. 62/876,317, filed on Jul. 19, 2019, provisional application No. 62/866,390, filed on Jun. 25, 2019.

(51) Int. Cl.
*A61G 5/10* (2006.01)
*G06F 3/16* (2006.01)
(Continued)

(52) U.S. Cl.
CPC .............. *A61G 5/1059* (2013.01); *A61G 5/08* (2013.01); *A61G 5/1002* (2013.01); *B66F 3/08* (2013.01);
(Continued)

(58) Field of Classification Search
CPC ...... A61G 5/1059; A61G 5/08; A61G 5/1002; A61G 2203/18; A61G 2203/30;
(Continued)

(56) References Cited

U.S. PATENT DOCUMENTS

| 4,514,867 A | 5/1985 | Jensen |
| 4,862,997 A | 9/1989 | Eberle |

(Continued)

FOREIGN PATENT DOCUMENTS

| CN | 101474115 B | 2/2011 |
| CN | 204121300 U | * 1/2015 |

(Continued)

OTHER PUBLICATIONS

Salih, Yasir et al. "Depth and Geometry from a single 2D image using triangulation", Multimedia and Expo Workshops (ICMEW), 2012 IEEE International Conference on, Melbourne Australia, pp. 511-515, Jul. 9-13, 2012, (Year: 2012).*

(Continued)

*Primary Examiner* — James A Shriver, II
*Assistant Examiner* — Ian Bryce Shelton
(74) *Attorney, Agent, or Firm* — Dorsey & Whitney LLP

(57) ABSTRACT

A multifunction wheelchair, with fixed or folding frame, is described. The multifunction wheelchair is reconfigurable, by a transformation mechanism, between a normal use, ergonomic configuration and a roll-over-toilet configuration. This transformation involves raising the seat of the wheelchair, as needed, to position the wheelchair over the determined height of a toilet, and opening a seat closure mechanism to expose a cutout in the seat for toilet use. This transformation may be at least partially automated. In examples, the multifunction wheelchair is equipped with electronics (e.g., camera, microcontroller) to determine the toilet seat height for making height and/or steering adjustments. The transformation mechanism may be provided as a retrofit kit.

21 Claims, 18 Drawing Sheets

(51) Int. Cl.
*B66F 3/08* (2006.01)
*A61G 5/08* (2006.01)

(52) U.S. Cl.
CPC .......... *G06F 3/167* (2013.01); *A61G 2203/18* (2013.01); *A61G 2203/30* (2013.01); *A61G 2203/40* (2013.01)

(58) Field of Classification Search
CPC ............ A61G 2203/40; A61G 2203/22; A61G 5/0825; B66F 3/08; G06F 3/167
See application file for complete search history.

(56) References Cited

U.S. PATENT DOCUMENTS

| | | | |
|---|---|---|---|
| 5,255,934 A | | 10/1993 | Wilson |
| 5,380,034 A | * | 1/1995 | Wilson .................. A61G 7/053 297/29 |
| 5,704,439 A | | 1/1998 | Kitahama et al. |
| 6,050,582 A | * | 4/2000 | Horacek ............. A61G 5/0825 280/42 |
| 6,209,901 B1 | | 4/2001 | Patel |
| 6,540,250 B1 | * | 4/2003 | Peterson ................ A61G 5/125 297/DIG. 10 |
| 7,793,364 B1 | * | 9/2010 | Johnson ............... A61G 5/1002 4/480 |
| 7,845,665 B2 | | 12/2010 | Boriseff |
| 7,988,172 B2 | | 8/2011 | Richter et al. |
| 8,151,380 B2 | * | 4/2012 | Johnson ............... A61G 5/1002 4/480 |
| 9,393,167 B2 | * | 7/2016 | Ganel ...................... A61G 5/00 |
| 10,080,700 B1 | * | 9/2018 | Bagheri .................. A61H 3/04 |
| 11,013,649 B2 | * | 5/2021 | Sonoda ................ A61G 5/1045 |
| 2008/0133089 A1 | | 6/2008 | Bayomy et al. |
| 2009/0064407 A1 | | 3/2009 | Altaparro |
| 2010/0194077 A1 | * | 8/2010 | Wagner ................ A61G 5/1054 280/650 |
| 2011/0175329 A1 | * | 7/2011 | Gingras .................. A61G 5/08 280/647 |
| 2012/0090086 A1 | | 4/2012 | Melone, Jr. et al. |
| 2012/0187663 A1 | * | 7/2012 | Wilson .................. A61G 5/125 280/657 |
| 2012/0316884 A1 | * | 12/2012 | Rozaieski ................ A61G 5/10 704/E21.001 |
| 2013/0091626 A1 | | 4/2013 | Al-jafar |
| 2014/0042727 A1 | * | 2/2014 | Musham ................ A61G 5/128 280/304.1 |
| 2014/0196207 A1 | * | 7/2014 | Enriquez ................ A61G 7/053 297/118 |
| 2015/0164717 A1 | * | 6/2015 | Lee ........................ A61G 5/125 701/22 |
| 2016/0008191 A1 | * | 1/2016 | Lee .......................... A61G 5/04 701/22 |
| 2017/0086594 A1 | * | 3/2017 | Khandrika ............... A47C 1/02 |
| 2017/0266069 A1 | * | 9/2017 | Lozano .................... A61G 5/04 |
| 2018/0200128 A1 | * | 7/2018 | Chun .................... A61G 5/1091 |
| 2018/0224853 A1 | * | 8/2018 | Izhikevich ........... G05D 1/0276 |
| 2018/0369039 A1 | * | 12/2018 | Bhimavarapu ......... G16H 40/63 |
| 2019/0049977 A1 | * | 2/2019 | Dean ........................ A61G 5/04 |
| 2019/0142665 A1 | * | 5/2019 | Spence .................. A47C 7/506 297/344.2 |
| 2019/0159633 A1 | * | 5/2019 | Lee ......................... A47K 3/006 |
| 2021/0290459 A1 | * | 9/2021 | Glikman .............. A61G 5/1059 |

FOREIGN PATENT DOCUMENTS

| | | | | |
|---|---|---|---|---|
| CN | 204121300 U | | 1/2015 | |
| CN | 106691723 A | * | 5/2017 | |
| CN | 107296693 A | * | 10/2017 | |
| CN | 107669423 A | * | 2/2018 | ............ A61G 5/061 |
| CN | 107951631 A | * | 4/2018 | |
| CN | 208770182 U | * | 4/2019 | ............ A61G 5/00 |
| DE | 20218195 U1 | * | 2/2003 | ........... A61G 5/1002 |
| JP | 2001204771 A | * | 7/2001 | |
| JP | 2009172108 A | | 8/2009 | |
| JP | 2017124263 A | * | 7/2017 | |
| KR | 20130037603 A | * | 4/2013 | |
| KR | 20170124398 A | * | 11/2017 | |
| WO | WO-2012059806 A1 | * | 5/2012 | ........... A61G 5/1002 |

OTHER PUBLICATIONS

"Beautiful Design. Reliable Performance. Affordable Price." Mansfield Plumbing, www.mansfieldplumbing.com/resources/frequently-asked-questions/toilets-faq/, retrieved Dec. 4, 2020.

"Bedsores (Pressure Ulcers)." Mayo Clinic, Mayo Foundation for Medical Education and Research, Mar. 9, 2018, www.mayoclinic.org/diseases-conditions/bed-sores/symptoms-causes/syc-20355893. 1.

Rova Wheelchairs, "RoVa Prescription Wheelchairs, and Shower/Toilet Wheelchair," http://www.os.co.za/rova, Aug. 2, 2003.

Bostelman, Roger et al., "A Multipurpose Robotic Wheelchair and Rehabilitation Device for the Home", IEEE/RSJ International Conference on Intelligent Robots and Systems (IROS) San Diego, CA, Oct. 29-Nov. 2, 2007, pp. 3348-3353.

Crytzer, Theresa Marie et al., "Identifying research needs for wheelchair transfers in the built environment", Disability and Rehabilitation Assistive Technology, May 2015, pg. All.

Dehn, T.C.B et al., "Haemorrhoids and Defaecatory Habits", Egyptian Journal of Medical Human Genetics, Elsevier, www.sciencedirect.com/science/article/pii/S0140673689917170?via=ihub, Oct. 28, 2003.

DiCianno, Brad E. et al., "The Voice of the Consumer: A Survey of Veterans and Other Users of Assistive Technology", Military Medicine, vol. 183, No. 11/12, Nov. 2018, pp. e518-e525. EBSCOhost, doi:10.1093/milmed/usy033.

Fox, Nathaniel, "Assisting in the Transfer from Wheelchair to Toilet", Master of Science thesis, 2009.

Jeannis, Hervens et al., "Initial development of direct interaction for a transfer robotic Arm system for caregivers", IEEE International Conference Rehabilitation Robotics, Jun. 2013.

Kaye, H. S. et al., "Wheelchair Use in the United States", Disability Statistics Abstract, No. 23., May 2002.

Kojima, Koryo, "A Market Research Report on the Development of an Electric Wheelchair with Toilet Functions—A Study on the Development of Welfare Support Equipment", Bulletin of Research Institute for Interdisciplinary Science Hachinohe Institute of Technology, vol. 4, pp. 97-101, Feb. 28, 2006.

Madigan, Elizabeth A. et al., "What Do Users Want From "Smart" Wheelchairs?", Bolton School of Nursing and Case School of Engineering, Department of Electrical Engineering and Computer Science, Case Western Reserve University, Cleveland Ohio US, Jun. 23, 2012.

Nordstrom, Birgitta et al., "The psychosocial impact on standing devices", Disability and Rehabilitation: Assistive Technology 9:4, pp. 299-306, Jun. 19, 2013.

Pettersson, Ingvor et al., "The effect of powered scooters on activity, participation and quality of life in elderly users", Disability and Rehabilitation: Assistive Technology 11:7, pp. 558-563, Mar. 24, 2015.

Salih, Yasir et al., "Depth and Geometry From a Single 2D Image Using Triangulation", Multimedia and Expo Workshops (ICMEW), 2012 IEEE International Conference on, Melbourne, Australia. pp. 511-515, Jul. 9-13, 2012.

Samuelsson, Kersti et al., "Powered wheelchairs and scooters for outdoor mobility: a pilot study on costs and benefits", Disability and Rehabilitation: Assistive Technology 9:4, pp. 330-334, Aug. 19, 2013.

Wang, Hongwu et al., "Development of an advanced mobile base for personal mobility and manipulation appliance generation II robotic wheelchair", The Journal of Spinal Cord Medicine, vol. 36, No. 4, Jul. 2013.

Wang, Hongwu et al., "The Personal Mobility and Manipulation Appliance (PerMMA): a robotic wheelchair with advanced mobility and manipulation", 34th Annual International Conference of the IEEE EMBS, Aug. 2012.

(56) References Cited

OTHER PUBLICATIONS

Yoon, W. J. et al., "Design and Development of a Smart Multifunction Toilet Wheelchair", IEEE conference, Aug. 23, 2018.

* cited by examiner

| | Image | Camera heights | Detected toilet seat | Vertical edges | Approximated radieus |
|---|---|---|---|---|---|
| (a) | | 90cm | | | 181.6 pixels |
| (b) | | 80cm | | | 187.4 pixels |
| (c) | | 70cm | | | 191.0 pixels |
| (d) | | 60cm | | | 195.0 pixels |
| (e) | | 55cm | | | 198.4 pixels |

FIG. 16

MULTIFUNCTION TOILET WHEELCHAIR

CROSS-REFERENCE TO RELATED APPLICATION(S)

This application claims the benefit under 35 U.S.C. § 119 of the earlier filing date of U.S. Provisional Application Ser. No. 62/866,390 filed Jun. 25, 2019, entitled "Smart Multifunction Toilet Wheelchair," and U.S. Provisional Application Ser. No. 62/876,317 filed Jul. 19, 2019, entitled "Apparatus for Folding Wheelchair Conversion to Adjustable Height Commmode," which are incorporated by reference herein in their entirety for any purpose.

TECHNICAL FIELD

Examples described herein relate to a multifunction wheelchair that can function as a typical ergonomic wheelchair, with either a fixed- or folding-frame design, and which can easily transform to a roll-over-toilet wheelchair solely by operation of the wheelchair user.

BACKGROUND

An estimated 75 million people or approximately 1% of the world's population are wheelchair users. Specifically, as of 2016, approximately 3.6 million people (roughly 1.2% of the US population) require the use of a wheelchair. For wheelchair users, using the restroom is inconvenient, physically stressful, and dangerous. Much of the time, wheelchair users need to haul themselves awkwardly out of their wheelchair in order to move onto the toilet, with accidents and injuries being disturbingly common. According to the FDA, 73% of cases of such accidents resulted from falls and tips during this process. Thus, many wheelchair users choose not to use public toilet facilities out of fear of embarrassment or injury. Current options exist that attempt to solve this problem, but are limited. Many are cumbersome, not adaptable to public places, or psychologically unacceptable for prolonged use. Lifting systems that can be installed in a person's home or other facility can be used to assist a wheelchair user, without involvement of another person, to the toilet but many people simply lack the upper body strength necessary to lift themselves out of their wheelchair and onto the toilet.

Existing wheelchair solutions do not offer a roll-over-toilet wheelchair which can also provide an ergonomic design to properly support the seated user with sufficiently low center of gravity to avoid risk of tipping, such as to be suitable for use during prolonged periods of time (e.g., most of the day). For example, a standard toilet may have a height anywhere between about 36 cm and about 48 cm, with ADA standard toilets generally ranging between 43.2 cm~48.3 cm and standard public toilets ranging between 36 cm~48 cm. The average floor-to-seat measurement of many wheelchairs is about 44.4 cm, making a large percentage of existing wheelchairs unsuitable for use as roll-over-toilet wheelchairs. Additionally, many wheelchairs components, such as the crossing members of a folding wheelchair frame or other structural supports that are located in the space below the seat, inhibit the wheelchair's ability to be positioned over most western-style toilets. Additional solutions may, therefore, be desired.

SUMMARY

Examples of a multifunction wheelchair that can function as a normal ergonomic wheelchair and transform to a roll-over-toilet wheelchair are described. The roll-over-toilet configuration enables users to remain in their own seat while using a toilet, which may decrease the stress and reduce the risks of accidents and injuries experienced by wheelchair users during a transfer to the toilet. Additionally, it allows users more freedom to use public restrooms, thus enhancing their independence and privacy while easing the burden on their family, friends, and caregivers. In some embodiments, the multifunction wheelchair is a smart multifunction wheelchair in that it is equipped with electronics that automate certain aspects of the transformation of the wheelchair between the ergonomic configuration and the roll-over-toilet configuration. Smart multifunction wheelchairs according to embodiments herein may be configured to automatically align and back the wheelchair to the toilet and/or automatically raise the wheelchair's seat above the toilet seat height based on the wheelchair's observation of the environment (e.g., through a camera directed behind the wheelchair) and estimation of the toilet seat height therefrom. A smart multifunction wheelchair may additional, optionally, be equipped with voice command capability.

A multifunction wheelchair according to some embodiments includes a frame supporting a seat and defining a cavity below the seat that has a sufficient width to accommodate a toilet. The frame includes a left frame portion and a right frame portion on opposite sides of the cavity, each of the left and right frame portions including a lower frame assembly and an upper frame assembly movably coupled to the lower frame assembly, with the upper frame assemblies supporting the seat such that it extends over the cavity and is movable relative to the lower frame assemblies. The wheelchair seat includes an opening extending from a top side of the seat to a bottom side of the seat. The multifunction wheelchair includes a lift assembly configured to raise and lower the upper frame assemblies and the seat relative to the lower frame assemblies, the lift assembly being arranged on the frame such that it does not extend into the cavity, a camera coupled to the frame to face away from a rear side of the frame, and a controller communicatively coupled to the lift assembly and the camera. In some embodiments, the controller includes a processor configured to receive an image of the toilet and to determine a seat height of the toilet from the image, and is configured to command the lift assembly to raise the upper frame assemblies and the seat to a position in which the seat is above the seat height of the toilet determined from the image.

The lift assembly is configured to raise the seat vertically without moving the seat horizontally relative to the lower frame assemblies. In some embodiments, the lift assembly includes a first lift mechanism coupled to the left frame portion and configured to lift the upper frame assembly of the left frame portion, and a second lift mechanism coupled to the right frame portion and configured to lift the upper frame assembly of the right frame portion, and wherein the at least one controller is configured to command the first and second lift mechanisms to raise the upper frame assembly of the left frame portion in synchrony with the upper frame assembly of the right frame portion. In some embodiments, the seat includes a closure mechanism operatively associated with the seat opening, the closure mechanism comprising a cover configured to support a portion of a user seated in the wheelchair when the closure mechanism is in a closed position. The closure mechanism may be automatically actuated to the open position based on operation of the lift assembly to raise the seat. In some embodiments, the support member is mechanically automatically actuated to the open position by the operation of the lift assembly to raise the seat.

In some embodiments, the processor is configured to determine the seat height of the toilet by estimating a location of a rim of a toilet bowl of the toilet within the image, and determining a height of the camera above the rim of the toilet bowl based, at least in part, on the estimated location of the rim of the toilet bowl. In some embodiments, the processor is configured to generate a binary mask image from the image of the toilet and use the binary mask image for estimating the location of the rim of the toilet bowl. In some embodiments, the processor is further configured to use the binary mask image to steer the wheelchair into a position in which the wheelchair is substantially centered with respect to the toilet bowl. In some embodiments, the multifunction wheelchair includes one or more user inputs to receive user commands for operating the lift assembly. In some embodiments, the user input(s) include a voice recognition module communicatively coupled to the processor, wherein the voice recognition module is configured to recognize a predetermined command and initiate raising or lowering of the seat responsive to the predetermined command. In some embodiments, the multifunction wheelchair is a folding wheelchair. In some such embodiments, the frame includes a left seat rail proximate the left frame portion and supporting a left side of the seat, a right seat rail proximate the right frame portion and supporting a right side of the seat, and a cross-bar linkage including a first link having a first end coupled to a front end of the left seat rail and a second end operatively associated with a first lift mechanism of the lift assembly, and a second link having a first end coupled to a front end of the right seat rail and a second end operatively associated with a second lift mechanism of the lift assembly, wherein the second link is pivotally coupled to the first link at a location between the first and second ends of the second link.

A method of transforming a wheelchair to a roll-over-toilet wheelchair according to some embodiments include providing a wheelchair in front of a toilet with a rear side of the wheel chair facing the toilet, and transforming the wheelchair to a roll-over-toilet wheelchair. The wheelchair is implemented in accordance with any of the examples herein. For example, the wheelchair includes a frame that includes left and right frame portions spaced apart from one another to define a cavity having a width that accommodates a toilet therebetween, with the left and right frame portions supporting a seat that extends above the cavity, and with each of the left and right frame portions including an upper frame assembly movably coupled to a lower frame assembly by a respective one of a left and right lift mechanisms positioned outside of the cavity. In some embodiments, the transforming of the wheelchair includes recording an image of the toilet with a camera arranged on the frame to face away from the rear side of the wheelchair, coupling the image to a processor operatively associated with a controller that actuates the left and right lift mechanisms, estimating, by the processor, a toilet seat height from the image of the toilet, wherein the estimating of the toilet seat height includes estimating a height of the camera above a toilet bowl of the toilet, and transmitting, by the processor, a signal to the controller to actuate the right and left lift mechanisms to raise the seat to a position above the toilet bowl. In some embodiments, providing the wheelchair in front of the toilet and/or the transforming of the wheelchair is initiated responsive to a voice command. The wheelchair includes a through opening in the seat and a closure mechanism selectively actuatable between open and closed positions, the transforming of the wheelchair further including actuating the closure mechanism to the open position. In some embodiments, raising the seat to the position above the toilet bowl causes the closure mechanism to be actuated to the open position.

In some embodiments, a kit for retrofitting a folding wheelchair into a multifunction folding wheelchair with a frame supporting an adjustable-height seat includes a cross-bar assembly configured to replace crossing frame members of a folding wheelchair, the cross-bar assembly including a first link having a first end pivotally couple to a front end of a first seat rail supporting the seat, and a second cross link having a first end pivotally coupled to a front end of a second seat rail supporting the seat, wherein the second link is pivotally coupled to the first link at a location spaced from the first end of the second link. The kit may also include a first lift mechanism operatively associated with a second end of the first link, a second lift mechanism operatively associated with a second end of the second link, and a user input configured to control operation of the first and second lift mechanisms to raise and lower the second ends of the first and second links. In some embodiments, each of the first and second lift mechanisms is implemented by a respective screw jack driven by a worm gear. In some embodiments, the user input is implemented by one or more cranks configured for manual operation of the respective worm gear to actuate the respective screw jack. In some embodiments, each of the first and second lift mechanisms is implemented by a respective electrically-powered actuator operatively associated with a portable battery carried on the wheelchair.

In some embodiments, the kit includes a multi-layer seat configured to be coupled to the first and second seat rails and reconfigurable between an open and closed configuration. The multi-layer seat includes a first support layer configured to remain fixed to both the first and second seat rails during use of the wheelchair. The first support layer has a cutout substantially centrally located on the first support layer. The multi-layer seat further includes a second support layer movable relative to the first support layer while the first support layer remains fixed to the first and second rails, so as to expose or conceal the cutout in the first support layer. The second support layer may be configured for reversibly coupling at least one edge thereof to the seat or frame. For example, the multi-layer seat may include fasteners (e.g., hooks, clips, magnets) arranged along at least one edge of the seat for reversibly fastening one edge of the second support layer to the frame when the seat is in the closed configuration. Reversibly fastening implies that the reversibly fastened component can be easily fastened and unfastened by the wheelchair user, without any tools. The multi-layer seat may provide a replacement seat for the existing seat of a folding wheelchair. The second support layer may be substantially co-extensive with the first support layer, and/or may be positioned over the first support layer (on a top side) of the multi-layer seat. Further embodiments of the present disclosure will be appreciated by referring to the drawings and further examples below.

BRIEF DESCRIPTION OF THE DRAWINGS

FIG. 16 shows examples of images associated with a toilet height estimation process, such as the one shown in FIG. 15, illustrating a relationship between a camera's vertical position to an estimated width of the toilet bowl rim.

DETAILED DESCRIPTION

Figure 2:
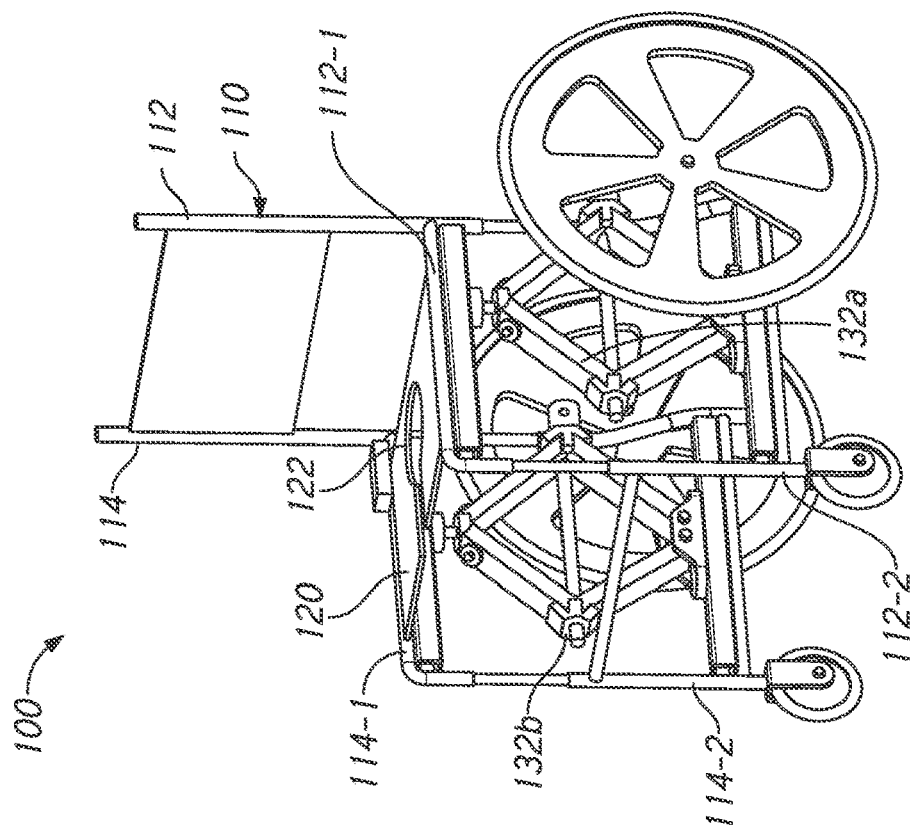
FIG. 2 illustrates the multifunction wheelchair of FIG. 1 in a second configuration.

Certain details are set forth below to provide a sufficient understanding of described examples. However, it will be clear to one skilled in the art that examples may be practiced without various of these particular details. In some instances, well-known circuits, control signals, timing protocols, and/or software operations have not been shown in detail in order to avoid unnecessarily obscuring the described examples.

As noted above, despite existing solutions for assisting wheelchair user with their use of restroom facilities, many wheelchair users have difficulty in transferring to or using toilets. Therefore, new solutions, examples of which are described herein, may be desirable for converting a wheelchair to a roll-over-toilet design to obviate the need for a user to transfer to the toilet and/or rely on a caregiver's assistance in the process. Examples of the present disclosure provide a multifunction wheelchair that includes a transformation mechanism enabling the wheelchair to be easily transformed from a normal ergonomic platform to a roll-over-toilet design. In some embodiments, the transformation mechanism can be implemented as a modular assembly, which may be used to retrofit an existing wheelchair frame (e.g., a folding wheelchair). In other embodiments, the transformation mechanism may be incorporated into the wheelchair as-built and delivered to an end user. In some embodiments, the multifunction wheelchair may be further equipped with intelligence (or smart) features such as computer vision (e.g., camera), automatic steering for positioning the wheelchair in front of the toilet, voice command capability, and/or automated control of certain functions of the multifunction wheelchair (e.g., the seat lift function and/or automatic steering function). In some embodiments, these intelligence features may be provided as an add-on module, which may be used to enhance the functionality provided by the transformation mechanism, either as retrofit or as integrated into the wheelchair design.

Various embodiments of a multifunction wheelchair and systems (e.g., a retrofit kit) for providing a multifunction wheelchair, are envisioned and described. In some embodiments, the multifunction wheelchair includes a transformation mechanism which can reconfigure the wheelchair to increase the height of the seat above the ground. The transformation mechanism of a multifunction wheelchair according to the present disclosure is operable to reconfigure the wheelchair between a first configuration (also referred to as lowered, normal-use, or ergonomic configuration) and a second configuration (also referred to as raised or roll-over-toilet configuration). The transformation mechanism includes a lift assembly operatively coupled to an upper portion of the wheelchair frame that supports the seat to selectively (e.g., responsive to electronic control or manual/user force) to raise and lower the upper portion of the frame and seat. The transformation mechanism may also include a closure mechanism configured to close an opening in the seat provided therein for toilet use (e.g., when the wheelchair is in the second configuration). The closure mechanism is actuatable between an open position to expose the opening in the seat, and a closed position in which a support member is provided across the opening to support a portion of the user's body (e.g., pelvic floor) when seated in the wheelchair. In some embodiments, the actuation of the closure mechanism between the open and closed position is tied to actuation of the lift system (e.g., to automatically open the closure mechanism when the lift system is actuation). In other embodiments, the actuation of the closure mechanism may be independent from actuation of the lift system to enable roll-over-toilet use of the wheelchair without raising the seat. The frame of the multifunction wheelchair is configured such that an under-seat cavity is defined below the seat of the wheelchair, which is wide enough to accommodate the width of a toilet. The height of some toilets may not be accommodated in the cavity when the wheelchair is in the first configuration, and thus the lift assembly may be actuated to raise an upper portion of the frame and the seat to increase the height of the under-seat cavity to a height that accommodates the height of the toilet below the seat. The lift assembly may be configured to raise and lower the seat by moving the seat vertically while maintaining the horizontal position of the seat relative to the lower portion of the frame and wheels, which may reduce the risk of tipping of the wheelchair.

In some embodiments, the lift assembly may be powered manually (e.g., by a crank or other suitable mechanism for transferring manual force to the lift mechanism(s)). In some embodiments, the lift assembly may be powered by an external source (e.g., electrical power) which may be activated manually (e.g., by user input through voice or manual pressing/toggling of a button/switch) or automatically (e.g., responsive to control signal(s) from an electronic controller). Different levels of automation may be provided in various embodiments herein. In some embodiments, the positioning of the wheelchair in front of the toilet may be automated. Thus, in some embodiments, the multifunction wheelchair may include an electronic controller, which is in communication with the lift assembly and which generates control signals to activate and deactivate a lift mechanism of the lift assembly, and/or to drive motors associated with the wheels in instances in which automated steering is provided. The electronic controller may include a processor which communicates with a camera, and optionally, one or more distance sensors. In some embodiments, the electronic controller may be part of an add-on module that may be separately added/retrofitted to a multifunction wheelchair. In some embodiments, the lift assembly includes one or more lift mechanism(s), which may be implemented using worm-gear drives, which may be powered by any suitable power source, including manually. In some embodiments, in which the lift assembly is powered by an external power source (e.g., electrically), a mechanism for manually powering the lift assembly may also be include, e.g., for emergency use.

In some embodiments, the transformation mechanism (e.g., lift assembly, seat closure mechanism) may be integrated into the wheelchair during its initial manufacture. In other embodiments, the transformation mechanism may be provided as a kit for retrofitting an existing, conventional wheelchair. Such a kit may include a lift assembly, components of which may replace certain structural members of the existing frame of the conventional wheelchair. For example, a retrofit kit for a conventional folding wheelchair may include a cross-bar assembly that replaces the crossing frame members located below the seat of a typical folding wheelchair. In some embodiments, the cross-bar assembly of a retrofit kit may include two rigid links that are pivotally coupled to one another at an intermediate location along their lengths to form a scissor-type linkage. The upper ends of the two rigid links may be connected near the front end of the seat rails and the lower ends of the two rigid links may be connected to a respective lift mechanism (e.g., a worm-gear drive, a motor-driven linear actuator, a hydraulic or pneumatic lift mechanism, etc.). The cross-bar assembly is arranged to be raised and lowered during transformation between the first and second configurations of the multifunction wheelchair. As such, the cross-bar assembly, once operatively connected to the appropriate components of the existing frame, becomes part of the upper, movable portion of the frame. In some embodiments, the cross-bar assembly is coupled to the seat rails near the front of the seat removing any blocking structure from the under-seat cavity. The lower connection point (i.e. the lower ends of each of the two rigid links) of the cross-bar assembly may be connected to any suitable lift mechanism to configure the folding wheelchair as a multifunction folding wheelchair. The cross-bar assembly together with the left and right lift mechanisms may be provided as an integrated modular assembly that can be easily connected between the left and right frame portions of a conventional folding wheel chair frame once the center crossing members thereof are removed.

Similar to a multifunction wheelchair with a fixed frame, the lift mechanisms of a multifunction wheelchair with a folding frame (e.g., retrofit module) may be operated by manual force or by any suitable external power source (e.g., electric, pneumatic, hydraulic, or any combination thereof). In some embodiments, a retrofit system or kit may further include a control automation module (e.g., electronic controller) that includes a processor and a plurality of sensors, including a camera and at least one distance sensor. The control automation module, or at least some components thereof, may be integrated with and thus be part of the modular unit that replaces the conventional crossing frame.

Figure 1:
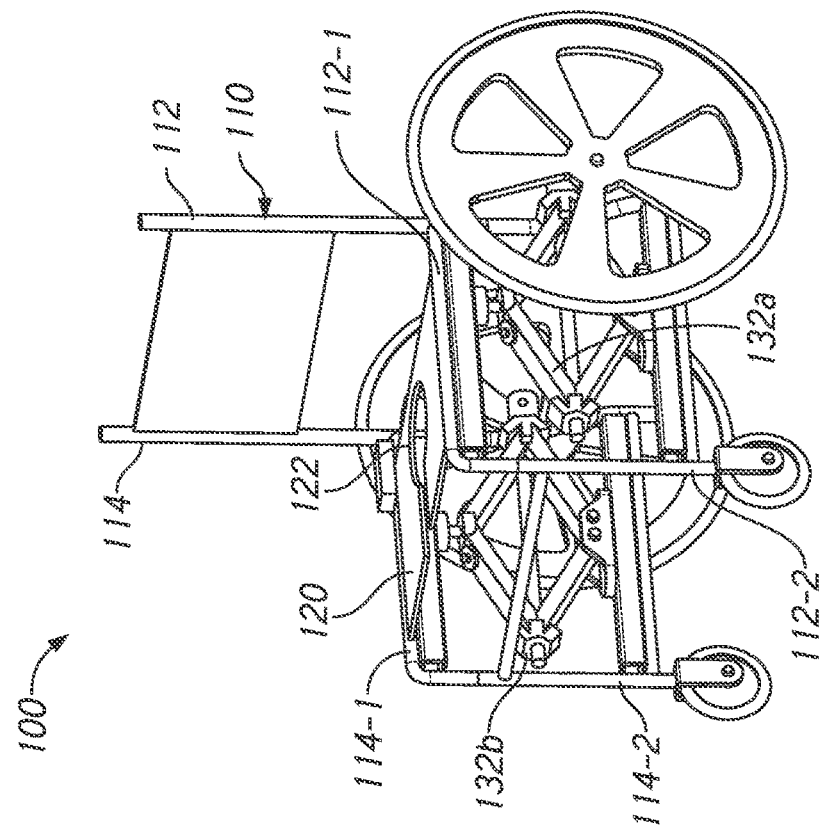
FIG. 1 illustrates of a multifunction wheelchair in accordance with examples of the present disclosure, shown herein a first configuration.
Figure 3:
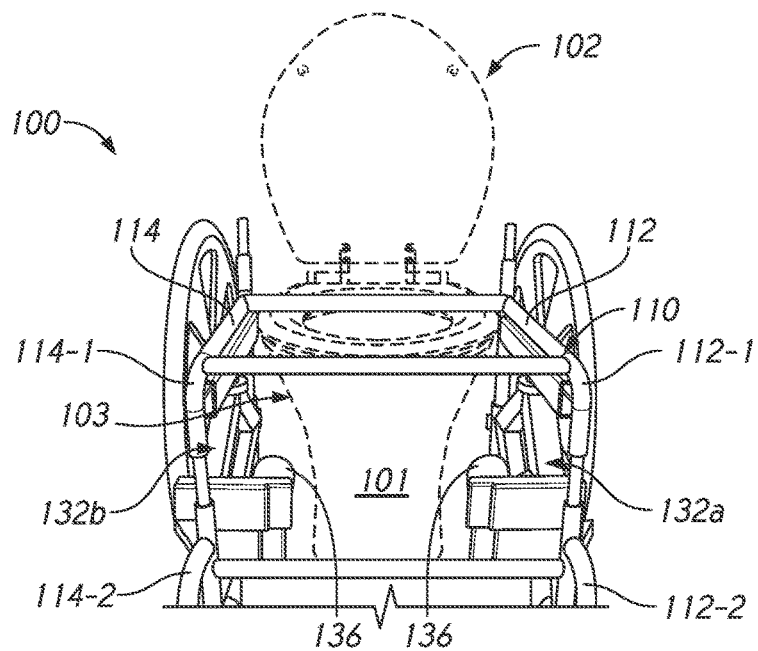
FIG. 3 is a front perspective view illustrating a portion of the wheelchair in FIGS. 1 and 2 positioned in front of a toilet.

FIGS. 1-3 show views of a multifunction (e.g., roll-over-toilet) wheelchair in accordance with embodiments of the present disclosure. One or more components, such as the footrests and armrests of the wheelchair in FIGS. 1 and 2 or the seat and backrest of the wheelchair in FIG. 3, are omitted from these views so as not to obfuscated illustration and description of unique features of the multifunction wheelchair. Referring to FIGS. 1-3, the multifunction wheelchair 100 includes a frame 110 which supports a seat 120. The wheelchair 100 includes a transformation mechanism, which includes a lift assembly (e.g., first and second lift mechanisms 132a, 132b) that can raise and lower the seat 120. As shown in FIGS. 1 and 2, the lift assembly (e.g., first and second lift mechanisms 132a, 132b) is configured to raise or lift the seat 120 by moving it substantially vertically and without translating or moving the seat horizontally. When raised, the horizontal position of the seat 120 with respect to the base of the wheelchair (e.g., front and rear wheels) remains substantially unchanged.

The frame 110 of the wheelchair 100 includes a left frame portion 112 (also referred to, simply, as left frame 112) and a right frame portion 114 (also referred to, simply, as right frame 114). The frame 110 supports the seat 120 such that it extends between the left frame 112 and the right frame 114. Specifically, the seat 120 is supported by the upper portions 112-1 and 114-1 of the left and right frames 112 and 114, respectively. The upper portions 112-1 and 114-1 are operatively coupled to their respective lower portion 112-2 and 114-2 to maintain the seat in a stable position during use of the wheelchair 100 and during transition between the lowered and raised configuration. The upper portions 112-1 and 114-1 and lower portions 112-2 and 114-2 may also be referred to as upper frame assemblies 112-1 and 114-1 and lower frame assemblies 112-2 and 114-2. Each of the upper and lower frame assemblies 112-1, 114-1 and 112-2, 114-2, respectively, may include one or more frame members (e.g., tubes or other structural members) that can carry the loads associated with use of the wheelchair 100, e.g., to support a seated user for extended periods of time and facilitate mobility for the seated user, and to stably support the user while raising and lowering the seat.

The seat 120 includes a cutout or opening 122. The opening 122 is a through opening extending from the upper side of the seat 120 to the underside of the seat 120 and is suitably positioned on the seat 120 to enable the wheelchair user to use the toilet without transferring from the wheelchair 100 to the toilet 102. A closure mechanism (not shown in this view) is operatively associated with the opening 122. A closure mechanism is provided to better support the seated user (e.g., more fully supporting the user's pelvic floor and anal cushions) when the user is not using the toilet. Thus, the multifunction wheelchair 100 provides a non-permanent opening in the seat, which can reduce the increased pressure on the anal cushions when not in toilet use. The closure mechanism is actuatable between an open position in which the opening 122 is opened or exposed, and a closed position in which a support member fills or extends across the opening 122 to more fully support the user during non-toilet use of the wheelchair 100. Being able to reconfigure the multifunction wheelchair 100 to a normal, ergonomic configuration in which the opening 122 is closed, e.g., for use during the majority of the user's day, may reduce the risk of the user developing certain health problems such as hemorrhoids, sores, etc.

As can be seen in FIG. 3, the left and right frames 112 and 114, respectively, are spaced apart from one another whereby a cavity 101 is defined below the seat 120 between the left and right frames 112 and 114, respectively. The cavity 101, also referred to herein as under-seat cavity 101, has a sufficient width at any location of the cavity to accommodate a typical, western-style toilet 102 between the left frame 112 and the right frame 114. In other words, all components associated with each of the left and right frames 112 and 114, respectively, are positioned such that they are outside and do not extend into the cavity 101. The cavity 101 need not have a constant width (see FIG. 3) as long as the width at any given location is such that the cavity 101 can accommodate the width of a toilet 102. The height (from floor to the rim of the toilet bowl 103) of western-style toilets 102 is typically within the range of about 36 cm to about 48 cm. For some toilets, the cavity 101 may not have sufficient height to accommodate the toilet bowl below the seat 120 when the wheelchair 100 is in the first (e.g., lowered) configuration. The multifunction wheelchair 100 is thus equipped with a transformation mechanism according to any of the examples herein, which can transform or reconfigure the wheelchair 100 into a second (e.g., raised or roll-over-toilet) configuration with relative ease (e.g., solely operated by the wheelchair user). In addition to a lifting function, the transformation mechanism may also include a seat closure mechanism (or simply seat closure) that reconfigures the seat between a full seat support for normal (e.g., ergonomic) use and partial seat support for roll-over-toilet use during which the opening through the seat is exposed to enable use of the facilities. All of the components of the transformation mechanism are provided on the wheelchair so as to remain outside of the cavity 101 when the wheelchair is in the roll-over-toilet configuration.

Figure 4:
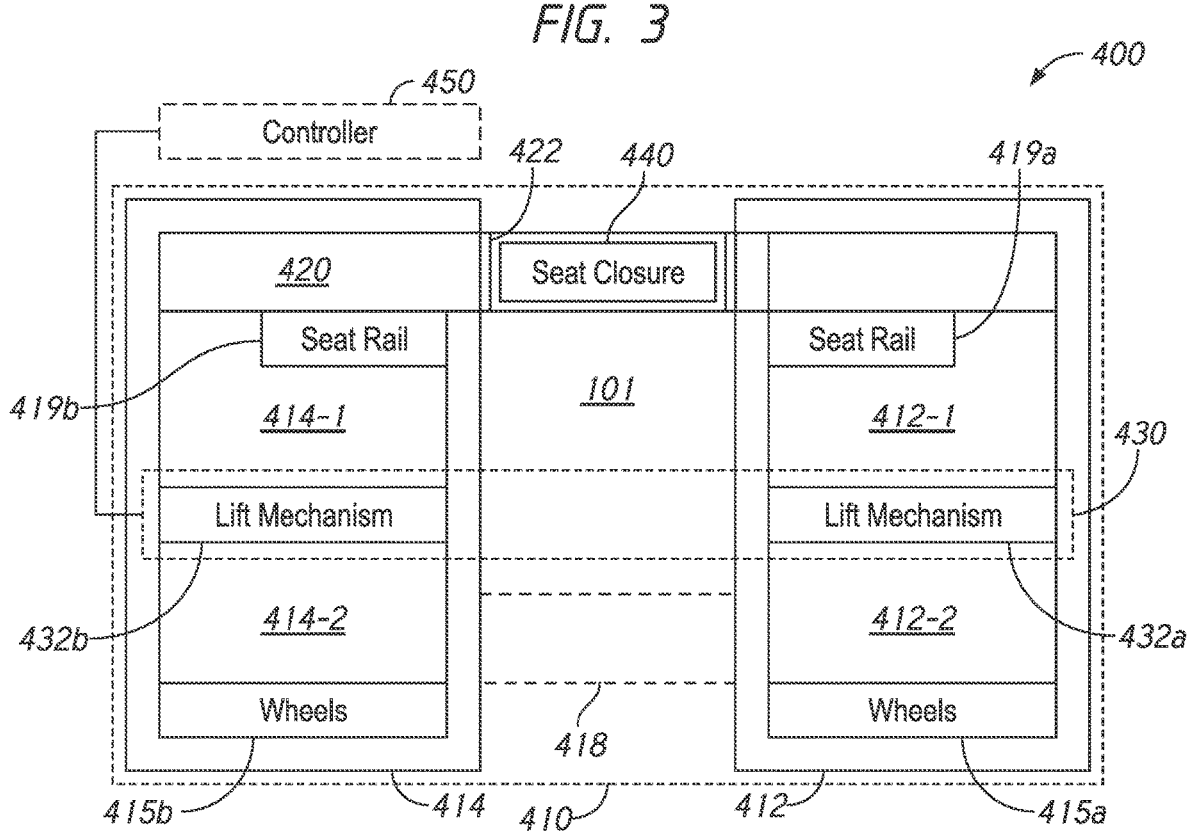
FIG. 4 is a block diagram of a multifunction wheelchair according to some embodiments of the present disclosure.

FIG. 4 shows a block diagram of a multifunction wheelchair 400 according to the present disclosure. The wheelchair 400 includes a frame 410 that supports a seat 420. The frame 410 include a first-side (e.g. left) frame 412 and a second-side (e.g., right) frame 414. The first-side frame 412 is spaced apart from the second-side frame 414 to define an under-seat cavity 101 of sufficient width to accommodate a toilet. In some embodiments, the frame 410 is a fixed frame in that the spaced relationship of the first-side frame 412 and the second-side frame 414 is fixed. In other embodiments, the frame 410 may be a folding frame. In such embodiments, the first-side and second-side frames 412 and 414 may be movably coupled to one another whereby the separation of spacing between the two frames 412 and 414 may be reduced, such as when the wheelchair 400 is not in use but is folded for transport and/or storage. In such embodiments, the frame 410 may include a folding mechanism 418 (e.g., a cross-bar linkage) that movably connects the first-side frame 412 to the second-side frame 414. In embodiments according to the present disclosure, the folding mechanism 418 is arranged on the frame 410 such that it also does not extend into the cavity 101. It will be understood that the cavity 101 does not need to include all of the under-seat space along the full depth of the wheelchair 10 as long as the cavity 101 has sufficient depth to accommodate the toilet 102 in a suitable position below the seat (e.g., 120, 420) in which that the toilet bowl 103 is positioned below the seat cutout 112.

In the block diagram in FIG. 4, each of the frames 412 and 414 includes respective upper and lower portions. That is, the first-side (e.g., left) frame 412 includes an upper frame portion 412-1, which may also be referred to as upper frame assembly, and a lower frame portion 412-2, which may also be referred to as lower frame assembly. Similarly, the second-side (e.g., right) frame 412 includes an upper frame portion 412-1, which may also be referred to as upper frame assembly, and a lower frame portion 412-2, which may also be referred to as lower frame assembly. The upper frame portion of the wheelchair 400, which includes the upper portion 412-1 and 414-1 is movably coupled to the lower frame portion (e.g., lower portions 412-2 and 414-2) of the wheel chair 400 by a lift assembly 430.

In preferred embodiments, the transformation mechanism is configured to substantially maintain the relative horizontal position of the seat with respect to the wheels 415*a*, 415*b*, when raising and lowering the seat 420. In other words, while the vertical position of the seat 420 relative to the wheels 415*a*, 415*b* may change during the raising and lowering of the seat 420, the horizontal position of the seat 420 relative to the wheels 415*a*, 415*b* remains substantially unchanged. In some embodiments, at least a portion of each of the upper portions 412-1 and 414-1 may extend into its respective lower portion 412-2 and 414-2 when the wheelchair 400 is in the first configuration and in the second configuration, which may provide added stability. For example, part of a frame member of the upper portion 412-1 (e.g., upper front tube, upper rear tube) may be movably received within a frame member of the lower frame portion 414-2 (e.g., lower front tube, lower rear tube). The part of the upper frame received in the lower frame may extend out of the lower frame but otherwise remain engaged, with a portion thereof remain inserted in the lower frame when the wheelchair is at its maximum vertical height. The upper frame may thus be operatively coupled to the lower frame to be movable in one direction (e.g. up and down) but substantially restricted from moving in other directions (e.g., laterally) to enhance the lateral stability of the wheelchair frame provided by the lift assembly, particularly in the elevated position. In some embodiments, the received and receiving components of the frame may include one or more frame members that are substantially vertically arranged, thereby restricting any substantially lateral movement of the upper frame during the transformation.

The lift assembly may include one or more lift mechanisms positioned to remain outside of the cavity 101. The lift mechanism(s) of the lift assembly may be powered manually (e.g., actuated to raise and lower the seat through manual force) or they may be powered by a power source other than the user (e.g., a motor-driven actuator, a pneumatic actuator, a hydraulic actuator, or a combination thereof), which may be controlled by controller 450. In some embodiments, the lift assembly 430 may include two separate actuators positioned on each side of the frame to remain outside of the cavity 101. In other embodiments, a single actuator (e.g., lift motor) may be used to power the lift of the right and left upper frames. The single actuator may be operatively connected using a suitable linkage that doesn't extend into the cavity 101. Any suitable arrangement of components may be used as long as the components of the lift assembly remain outside of the cavity 101.

In the example in FIG. 4, the lift assembly includes a first lift mechanism 432a associated with the first-side frame and a second lift mechanism 432b associated with the second-side frame. The first lift mechanism 432a movably couples the upper portion 412-1 of the first-side frame 412 to the lower portion 412-2 of the first-side frame 412 without extending into the cavity 101 including the during operation of the first lift mechanism. The second lift mechanism 432b movably couples the upper portion 414-1 of the second-side frame 414 to the lower portion 414-2 of the second-side frame 414 without extending into the cavity 101 including the during operation of the first lift mechanism.

Figure 5A:
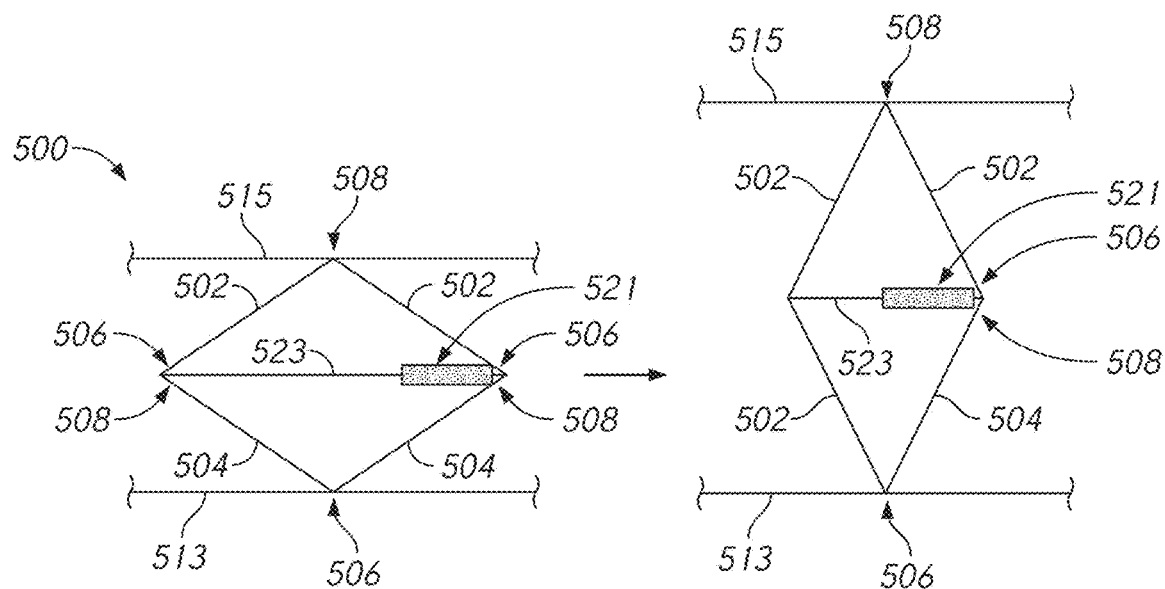
FIG. 5A is a simplified illustration of an example scissor lift for raising and lowering the upper frame of a multifunction wheelchair.

A scissor lift mechanism (or simply scissor lift) powered by any suitable actuator (e.g., a worm-driven screw or other linear actuator, which may be driven by an electric motor) may be used, in some embodiments, to implement the lift mechanism on each side of the frame. In an example arrangement, the scissor lift mechanism may include upper and lower inclined links 502, 504 operatively connected to form a generally diamond shaped scissor jack 500, as shown in FIG. 5A. The lower ends 506 of the lower inclined links 504 are pivotally connected to the lower frame 513, and in this case also pivotally connected to one another. The upper ends 508 of the upper links 502 are pivotally connected to the upper frame 515, and in this case also pivotally connected to one another. In other examples, the lower ends 506 of the lower inclined links 504 that are connected to the lower frame and/or the upper ends 508 of the upper links 502 that are connected to the upper frame 515 may be spaced apart from one another. The upper ends 508 of the lower links 502 are pivotally connected to the lower ends 506 of the upper links 502 to form the generally diamond shaped scissor jack 500. The actuator 521 (e.g., a worm-gear driven extendible rod 523 or other linear actuator that has an extendible rod 523) is operatively connected between the inclined links 502 and 504 to vary the distance S between the upper ends 508 of the lower links 504 and the lower ends 506 of the upper links 502. In the configuration in FIG. 5A, as the distance S decreases responsive to a retraction of the actuator 521 caused the scissor jack 500 to raise the upper frame 515 relative to the lower frame 513, as shown in the right frame of FIG. 5A, while the lower frame 513 remains in contact with the ground (e.g., via the wheels of the wheelchair). To reverse this action, the distance S may be increased responsive to extension of the extendible rod 523 of the actuator 521, whereby the scissor jack 500 lowers the upper frame 515 relative to the lower frame 513.

Figure 5B:
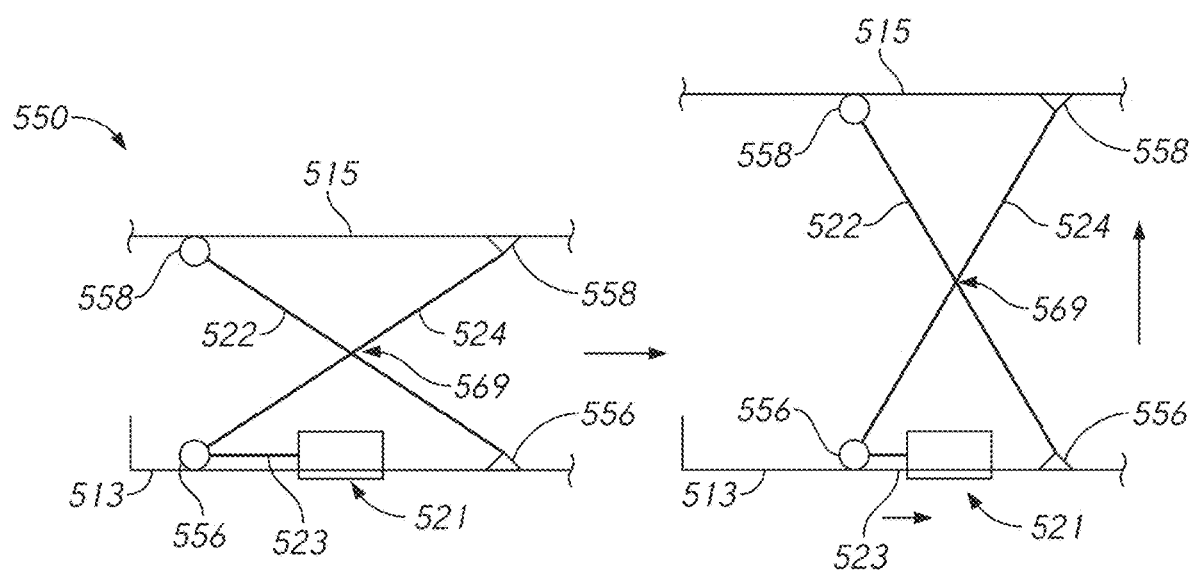
FIG. 5B is a simplified illustration of another example scissor lift for raising and lowering the upper frame of a multifunction wheelchair.

In other embodiments, the actuator 521 may be differently arranged such that an extension stroke of the actuator 521 causes reduction of the distance S, thus raising of the upper frame. In yet other examples, the scissor lift may be configured with a pair of crossed links. Referring to FIG. 5B, a first link 522 has a lower end 556 pivotally coupled to the lower frame 513 at anchor 565 and an upper end 558 rollably coupled to the upper frame 515. A second link 524 has an upper end 558 pivotally coupled to the upper frame 515 at anchor 567 and a lower end 556 rollably coupled to the lower frame 513. The links 522 and 524 are arranged such that they cross at an intermediate location 569 along their lengths. In some embodiments, the links 522 and 524 are pivotally connected at the location 569 using any suitable pivot joint (e.g., a simple pin joint). An actuator 521, which may be a worm drive or other linear actuator that has an extendible rod 523, is operatively associated with the crossed links 522 and 524 to apply an actuation force to one of the rollably supported ends. For example, the actuator 521 may be arranged to apply the actuation force to the lower end 556 of the second link 524, as shown in FIG. 5B, to vary the distance between the lower end 556 of the first link 522 and the lower end 556 of the second link 524. In other examples, the actuator may be arranged to apply actuation force the upper end 558 of the first link 522 to vary the distance between the upper ends 558 of the first and second links 522 and 524. In either of these arrangements, an increase in the distance between the lower ends 556 or the upper ends 558 of the first and second links 552 and 554, a resulting decrease in the distance between the upper and lower frames is achieved to lower the upper frame relative to the lower frame. The increase in the distance may be achieved by an extension stroke of the actuator 521 as in the example in FIG. 5B, or the actuator may be arranged to push the two lower ends 556 or the two upper ends 558 together during an extension stroke. A scissor lift of any suitable arrangement may be used to provide mechanical advantage to raise of the upper frame with the user seated in the wheelchair without requiring excessive power (e.g., electrical/electro-mechanical) depending on the type of actuator used. Regardless of the configuration of the lift mechanism (s) (e.g., scissor lift(s)) or the manner in which actuator(s) are connected to power the lift mechanism(s), a suitable actuator in some embodiments may have a stroke that can obtain about 15 cm of lift.

The scissor lift arrangement shown in FIG. 5A, or the one shown in FIG. 5B may be used to implement each of the first and second lift mechanisms (e.g., 132a and 132b, 432a and 432b) of a multifunction wheelchair according to the present disclosure. The examples in FIGS. 5A and 5B show the arrangement of components on one side of the wheelchair frame, e.g., on the left side or the right side of the frame, with the understanding that the other side would include a the same arrangement of components for the second lift mechanism. In other embodiments, the actuator (e.g., a worm-gear drive or other linear actuator), may be differently operatively arranged to apply actuation force between the moving (i.e. upper) and non-moving (i.e. lower) portions of the frame, for example directly to the upper moving portion of the frame to lift of the upper portion of the frame.

Figure 10:
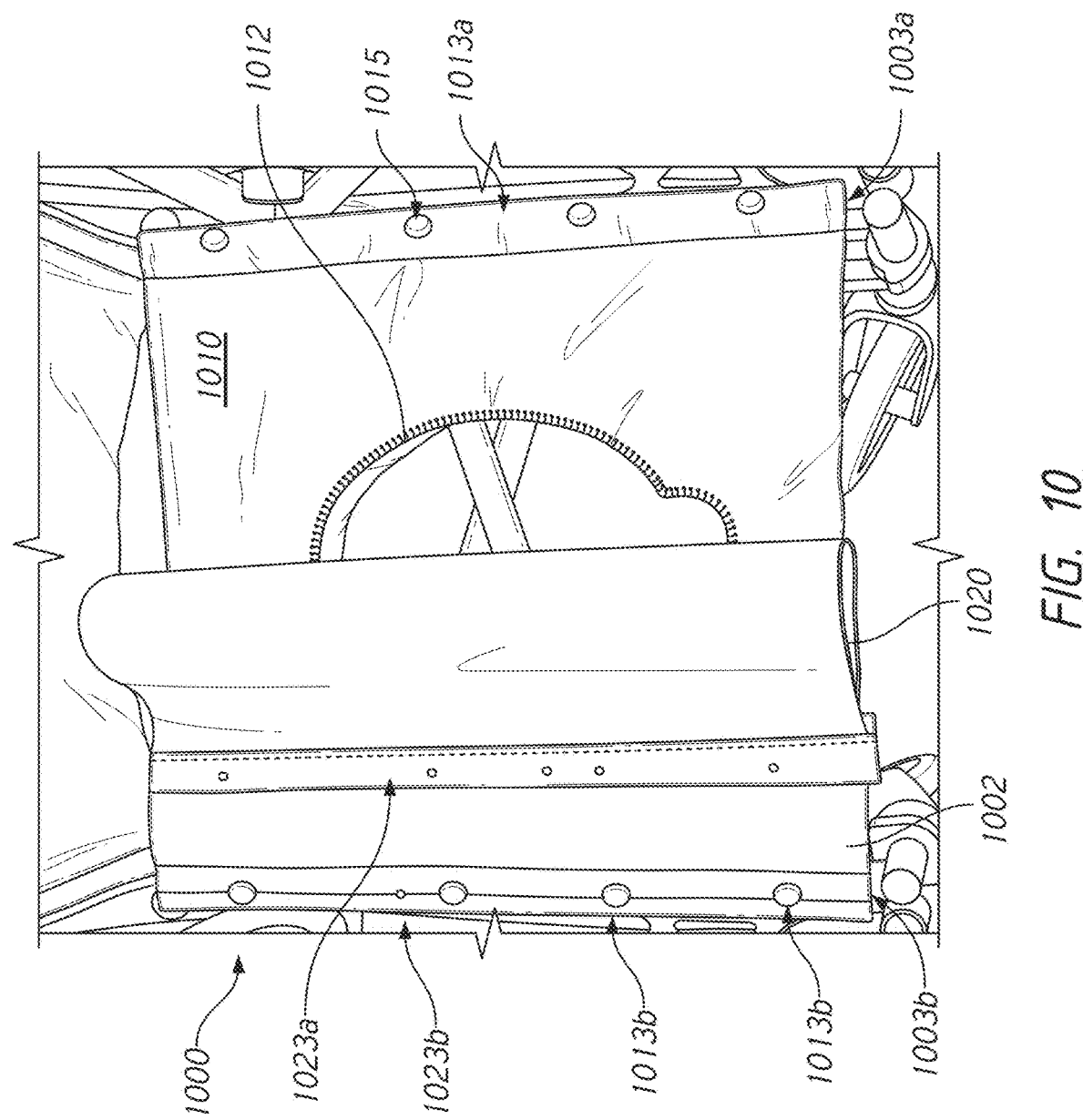
FIG. 10 is an illustration of a seat with a closure mechanism for a multifunction wheelchair in accordance with some embodiments herein.

Referring back to FIG. 4, the upper frame portions 412-1 and 414-1 of the first-side 412 and second-side 414 frames, respectively, each includes a seat rail. The first-side frame 412 includes a first seat rail 419a and the second-side frame 414 includes a second seat rail 419b, which together support the seat 420. The seat 420 is provided with a seat opening 422, which is operatively associated with a seat closure 440 for reconfiguring the wheelchair between the first (ergonomic use) configuration and the second (toilet-use) configuration. The opening 422 is a through opening which extends from the top side of the seat 420, which supports the user, to the bottom side of the seat 420, which is closest to the toilet bowl when the wheelchair is operatively positioned over the toilet. The seat opening 422 may be arranged relatively centrally between the first and second rails 419a and 419b, respectively. The seat opening 422 may be shaped similarly to the hole of a toilet seat, with a generally round portion in the back connected to a narrower portion at the front side of the opening 422, as shown in FIGS. 1 and 10. In some embodiments, the opening 422 may be differently shaped, such as having a substantially circular, oval, or other suitable regular or irregular shape. The seat closure 440 may be actuated by manual command and/or operated by manual force. In other embodiments, the seat closure 440 may be configured to transition to the open configuration automatically, e.g., as a response to or simultaneously with raising the seat, responsive to a signal from the controller 450, which may be dependent on or independent of the operation of the lift assembly 430. For example, the seat closure 440 may be activated to cause a support member of the seat closure to expose the opening 422 when the chair has been operatively positioned over the toilet. In other examples, the seat closure 440 may be activated to cause a support member of the seat closure to expose the opening 422 when a lift command is sent to the lift assembly 430. In other examples, the seat closure 440 may be actuated to the open position upon a determination that the seat has been raised to the appropriate height. In yet other examples, the seat closure 440 may be automatically actuated responsive to a determination that no raising of the seat 420 is needed. While the wheelchair 400 is provided with a lift assembly 430 for raising the seat in some instances to reconfigure the wheelchair for toilet use, it will be understood that reconfiguring the wheelchair 400 for toilet use may not require raising of the seat 420 in all cases.

Figure 6:
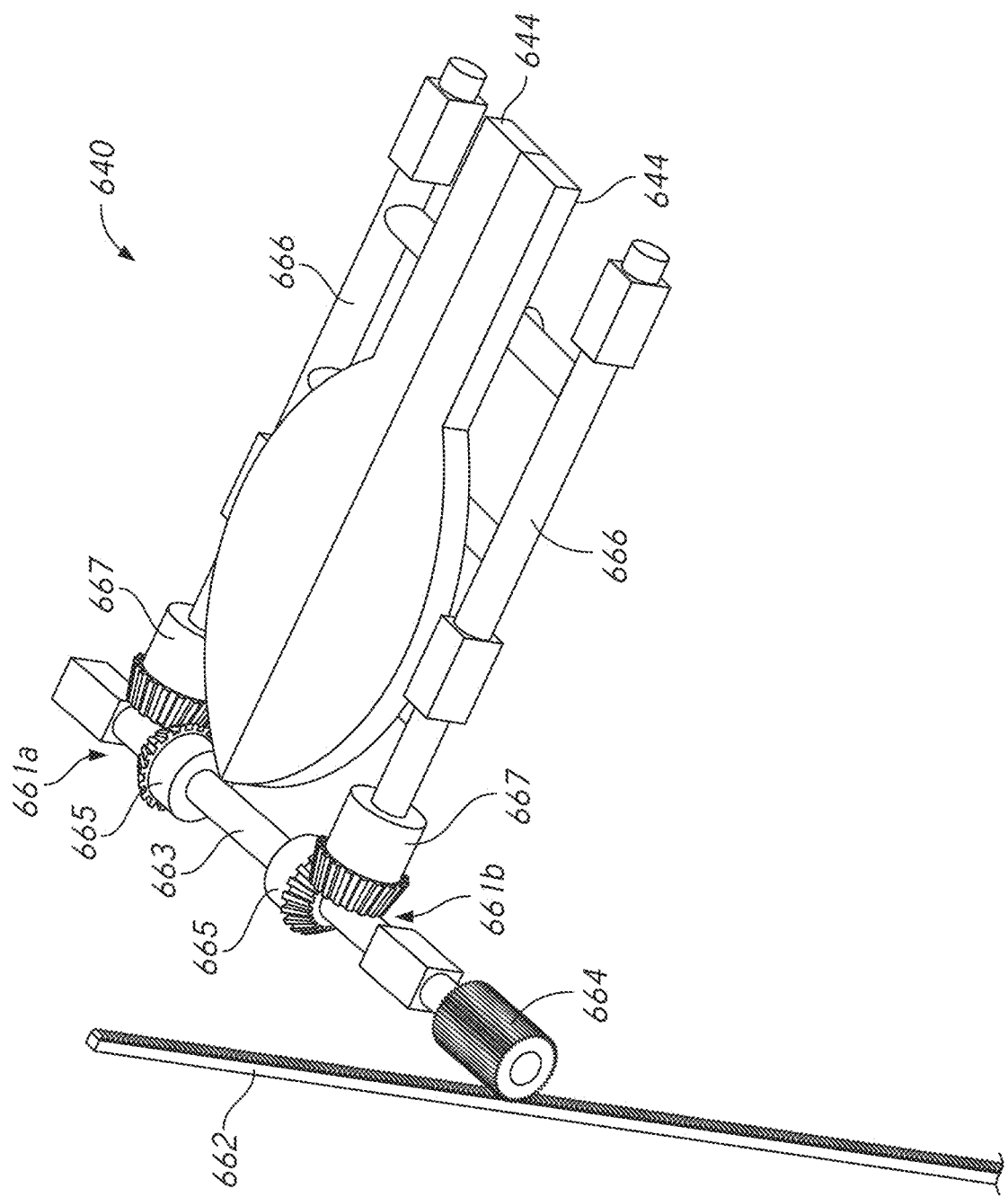
FIG. 6 illustrates a closure mechanism for a multifunction wheelchair in accordance with some embodiments of the present disclosure.

In some examples, the operation of the seat closure and the lift assembly may be interconnected. For example, the two may be interconnected mechanically such that the seat closure 440 transitions from the closed to the open configuration as a result of the lifting of the seat 420. In some such embodiments, the seat closure and lift mechanism(s) are operatively connected such that actuation of the lift mechanism(s) also actuates the seat closure (e.g., to open position responsive to lifting and to the closed position responsive to lowering of the seat). FIG. 6 shows an embodiment of a seat closure 640 which may be part of the transformation mechanism of a multifunction wheelchair such as wheelchair 100. The seat closure 640 configured for automatic actuation responsive to operation of the lift assembly (not shown in this view). The actuations (e.g., raising and lowering) of the lift mechanism may be transmitted to the seat closure 640 via a set of gears. For example, a rack 662 may be fixed to the lower frame (e.g., a rear tube of frame portion 112-2 or 114-2) such that it extends vertically from the lower frame towards the upper fame. In some embodiments, the rack 662 may be positioned near the rear side of the frame (e.g., near the rear lower frame members and backrest frame members) such that it can extend from the lower to the upper frame without interfering with the user's use of the wheelchair. The rack 662 remains fixed to the lower frame during the raising and lowering of the seat (e.g., seat 120). A pinion gear 664, carried on the moving upper frame (e.g., on the frame portion 112-1 or 114-1), is engaged or meshed with the rack 662 such that the raising and lowering of the upper frame and seat (e.g., seat 120) causes the pinion 664 to advance up and down the rack 664, respectively, rotating the pinion gear 664. The pinion gear 664 is fixed to a first shaft 663 which rotates in synchrony with the pinion gear 664. One or more first bevel gears 665 are coupled to the shaft 663 such that the rotation of the pinion gear 664 is transmitted to the one or more first bevel gears 665 via the shaft 663. Corresponding one or more second bevel gears 667 are each engaged or meshed with the respective first bevel gear(s) 665, whereby rotation of the first bevel gear(s) 665 is transmitted to one or more shafts 666 arranged at an angle to the first shaft 663 to rotate the one or more second shafts 666 in synchrony with the rotation of the first shaft 663. In this example, the first and second bevel gears 665 and 667, respectively, are arranged to transfer rotation to second shaft(s) 666 substantially perpendicular to the first shaft 663. In other examples, a different suitable arrangement may be used. Respective one or more support members 644 of the closure mechanism 640 are fixed to the respective one of the second shafts 666 such that they pivot (e.g., downward to an open position) responsive to the rotation of the first shaft 663 which is caused by the movement of the pinion gear 664 along the rack 662. In the example in FIG. 6, the closure mechanism 640 is implemented using a first support member actuated (e.g., pivoted) downward via the operative engagement of a first set 661a of first and second bevel gears 665 and 667, and a second support member actuated (e.g., pivoted) downward via the operative engagement of a second set 661b of first and second bevel gears 665 and 667.

In other embodiments, a single support member may be used to substantially occlude the opening 122 when the wheelchair is in the lower position. The single support member may be operatively coupled to the frame along any edge (e.g., its longitudinal edge or ear edge) to pivot downward. In other embodiments the support member may be configured to translate substantially in-plane such as by being slidably or rollably engaged, e.g., to the underside of the seat, to slide to one side of the opening during the second (roll-over-toilet) configuration. To properly support the body (e.g., pelvic floor) of the seated user in the normal/ergonomic configuration, the support member(s) may be configured to substantially fill the thickness of the opening 122 in some embodiments, such that a top side of the support member is generally at the same vertical position as other portion(s) of the seat adjacent to the opening 122. A support member that pivots toward and away from the seat may be more easily configured to fill the opening 122 and thus provide the appropriate user support in the ergonomic configuration. However, a sliding closure mechanism may also be used where the support member is configured to displace downward and then slide to the side when opening the closure mechanism. In yet other examples, as discussed further with reference to FIG. 10, the support member may be implemented using a bendable structure (e.g., a flexible seat layer) that can be moved out of the way to expose the opening 122 in the second configuration of the wheelchair and repositioned to extend across the opening 122 in the first configuration. While a single rack is illustrated in FIG. 6, in other examples, two racks may be used, each one fixed to a respective one of the left and right lower frames, which may provide a more robust transmission assembly. In some embodiments, the rotation of the gears closer to the left side of the frame may be decoupled from the rotation of the gears closer to the right side of the frame. In other examples, the shaft 663 may extend between and connect the left and right pinions gears, which may provide a further mechanism for ensuring that the seat remains substantially level as it is lifted relative to the lower frame. In yet further embodiments, the operation of the seat closure and lift mechanism may be electronically interconnected, meaning that the opening and closing of the seat closure may be responsive to electronic signals generated for operation of the lift assembly. In some embodiments, the seat closure is actuatable independent of the lift assembly.

As previously noted, in some embodiments, a portion of one of the frames (e.g., the upper frame or the lower frame) may be movably received in the other one of the upper and lower frames, which may improve the stability of the seat during the transition (up and down). For example, a frame member of one of the upper or lower frames may be implemented as a tube which movably receives a frame corresponding frame member of the other one of the upper or lower frames such that the received member can be partially extended out of the tube during the raising of the upper frame and seat while the upper and lower frames while partially remaining within the tube at the maximum height position of the wheelchair seat. This may enhance the stability (e.g., lateral stability) of the frame particularly in the raised position/configuration. In one embodiment, the upper or lower portions of each of the left and right frames includes at least one frame member (e.g., a front frame member and/or a rear frame member) which is movably received in a corresponding frame member of the other one of the upper and lower portions. The receiving frame member may be implemented as a tube (cylindrical or otherwise) and may be referred to as outer tube and the received frame member may be implemented as a rigid member of corresponding cross-sectional shape, e.g., an inner member, which may be a tube having a cross-sectional shape (e.g., cylindrical or otherwise) to that of the outer tube. The portion of the received frame member may be longer than the maximum available height adjustment such that at least part of the received frame member remains within the outer tube at all times (e.g., at the maximum seat height of the wheelchair). In some embodiments, the upper frame may include one or more received frame member(s) and the lower frame may include one or more receiving frame members. In some embodiments, all of the received members may be on the upper frame. In other embodiments, the upper frame may include only some of the all received members, while the lower frame includes the other received frame members, such that the upper frame and the lower frame each movably receive at least a portion of the other one of the upper frame and the lower frame. In an example embodiment, each of the left and right portions of the upper frame includes a received member at the front of the frame (e.g., left and right upper front inner members) and a receiving member located at the rear side of the frame (e.g., left and right rear outer tubes). The left and right portions of the lower frame, each include a receiving member at the front of the frame (e.g., left and right lower front outer tubes) and a received member located at the rear side of the frame (e.g., left and right lower inner members). In use, when the height of the wheelchair seat is adjusted up, the front inner members of the left and right upper frames extend out of the front outer tubes of the left and right lower frames but remain at least partially inserted therein even at the maximum seat height. Similarly, the rear outer tubes of the left and right upper frames move vertically, in some cases slidingly, relative to the rear inner members of the left and right lower frames with the lower rear inner members remaining at least partially inserted in the upper rear tubes at the maximum seat height. This inner-outer member arrangement may improve the lateral stability of the wheelchair frame, particularly in the elevated position.

In some embodiments, the multifunction wheelchair may be a folding wheelchair configured as a multifunction wheelchair during initial manufacture or with a retrofit kit according to the present disclosure. A multifunction folding wheelchair may include a frame that, similar to the fixed frame wheelchair, includes an upper frame portion movably coupled to a lower frame portion. However, unlike the fixed frame of a wheelchair where the distance between the first-side and second-side frames is fixed, typically by one or more rigid frame members that connect the first-side and second-side frames, the first-side and second-side frames of the folding multifunction wheelchair are movably coupled to one another. Like the fixed-frame wheelchair 100, and referring to the examples in FIGS. 7A and 7B, the frame 710 of a folding multifunction wheelchair 700, 700' defines a cavity 701 below the seat (not shown in this view), which cavity has a sufficient width to accommodate a toilet.

Figure 18B:
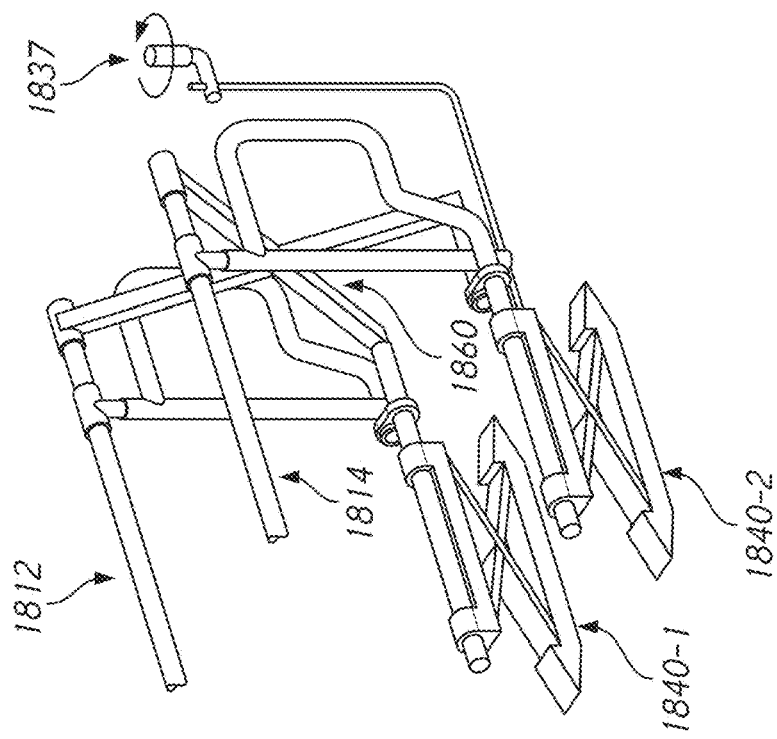
FIGS. 18A and 18B illustrate further examples of a folding frame of a multifunction wheelchair according to the present disclosure.
Figure 18A:
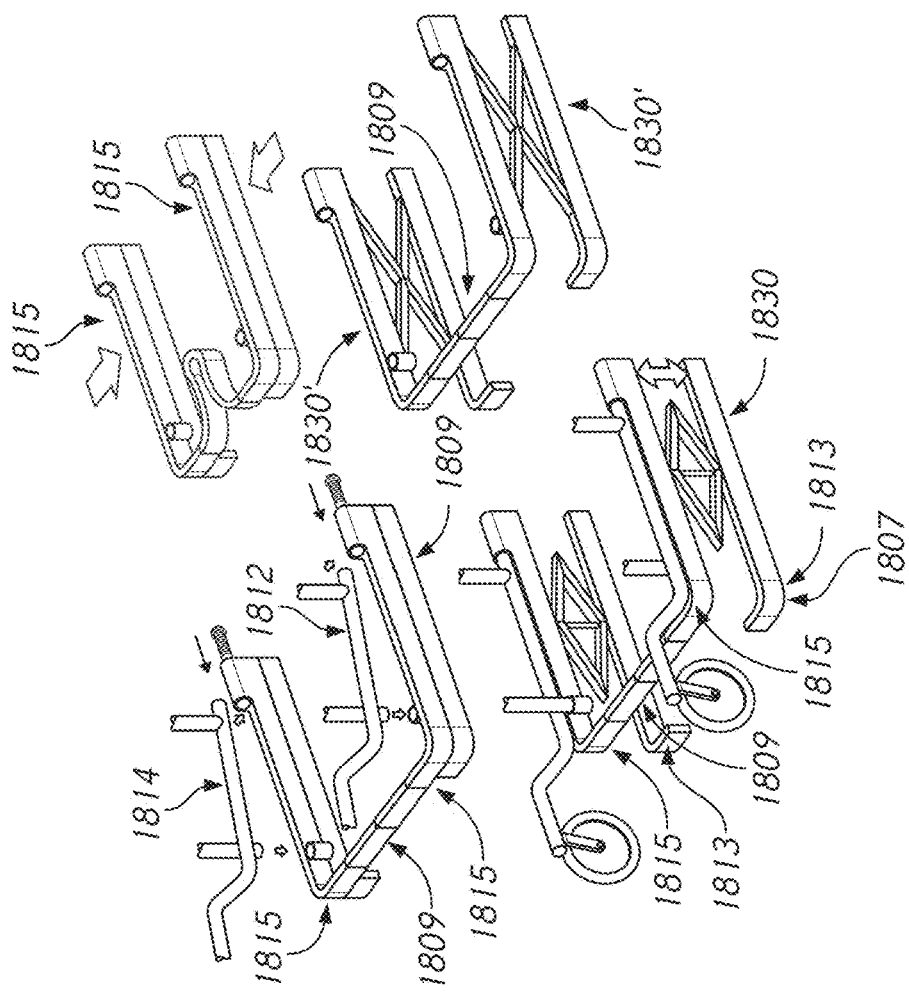
Figure 19:
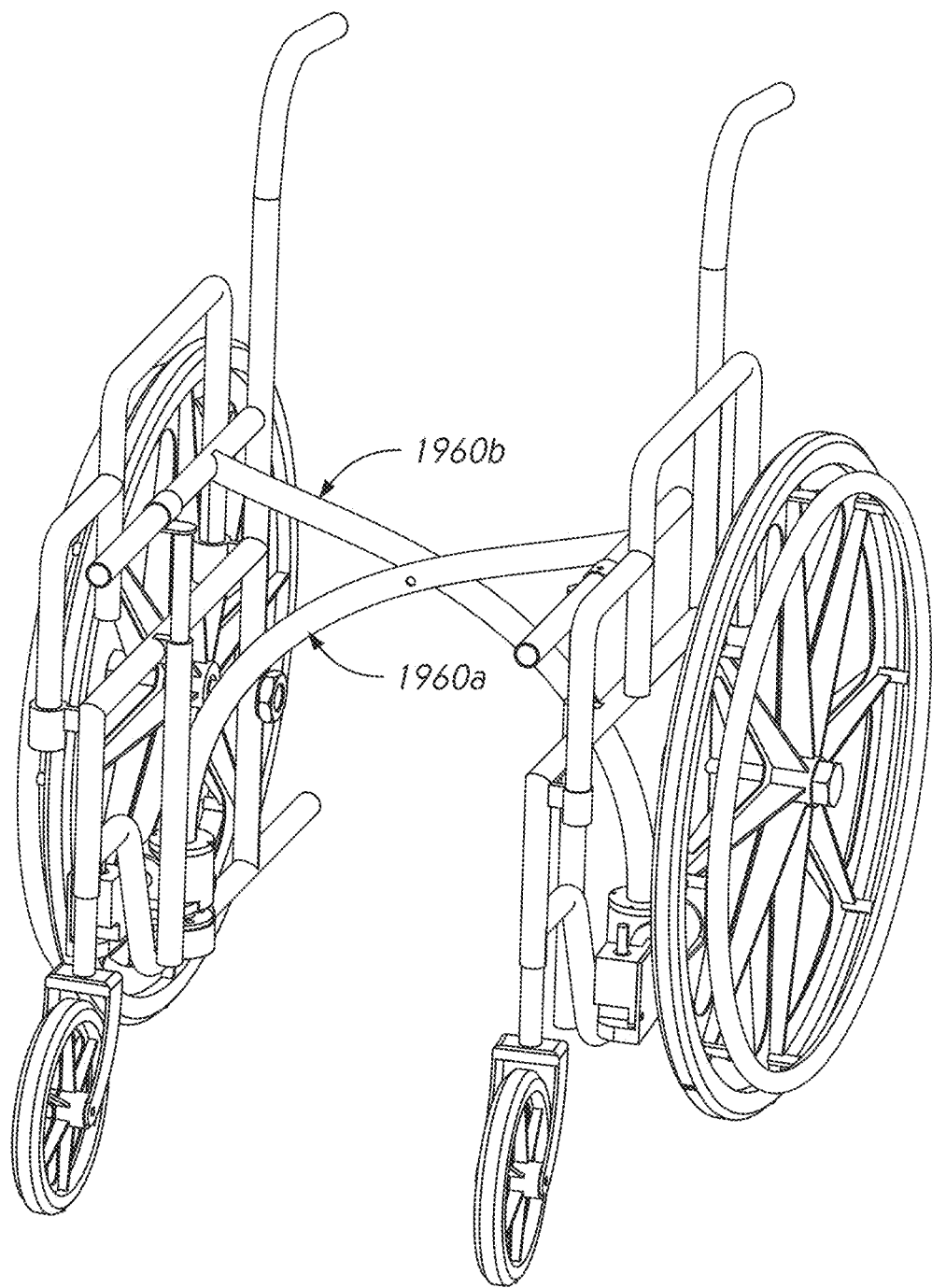
FIG. 19 is a view of a multifunction folding wheelchair with curved cross members.

The frame of the multifunction wheelchair may be made foldable using a variety of suitable mechanisms, such as a cross-bar linkage (e.g., as shown in FIGS. 7A-7B, 9A-9B, FIG. 18B and FIG. 19) or a bendable structure (e.g., as shown in FIG. 18A). The cross-bar linkage (e.g., linkage 760) is coupled to and connects the left frame 712 and the right frame 714 in a manner that positions the linkage 760 outside of the cavity 701, when the frame is unfolded. Like cavity 101, the cavity 701 is a cavity having sufficient width along the depth of the cavity to accommodate a toilet therein. This can be achieved in a variety of ways, for example by positioning the cross-bar linkage at the front of the wheelchair frame, such as by coupling the upper ends of the crossed bars 760a and 760b of the linkage 760 near the front end of the seat rails, as shown in the examples in FIGS. 7A-7B, 8A-8B, 18B, and 19B. In these examples, the crossed bars 760a and 760b of the linkage 760 are closer to the front wheels of the wheelchair than the rear wheels and remain in front of and thus outside of the cavity 701, ensuring that the cross-bar linkage 760, when unfolded, does not interfere with the positioning of the wheelchair over the toilet. As noted, the height of the wheelchair seat may be insufficient to fit over some toilets and thus a height adjustment mechanism (e.g., lift mechanism(s) 730) is additionally provided as part of the transformation mechanism of a multifunction wheelchair 700, 700'. In some embodiments, the cross-bar linkage, which in the case of a retrofit kit replaces the existing centrally-positioned crossing members of the folding frame, may be located more centrally or near the rear side of the frame but appropriately configured so as to not interfere with the positioning of the wheelchair over the toilet. In such embodiments, the rigid members or bars may be angled or curved bars 1960a and 1960b as shown in FIG. 19, or they may have more complex geometry (e.g., following a three dimensional contour along their lengthwise dimension) such that the crossing location of the links is vertically relocated to be substantially closer to the seat than to the lower end of the cross-bar linkage. Regardless of the configuration of the links and the resulting cross-bar linkage, the cross-bar linkage is configured to support the loads applied to seat (e.g., by the user) as well as during lifting and lowering of the seat with the seated user.

Figure 7A:
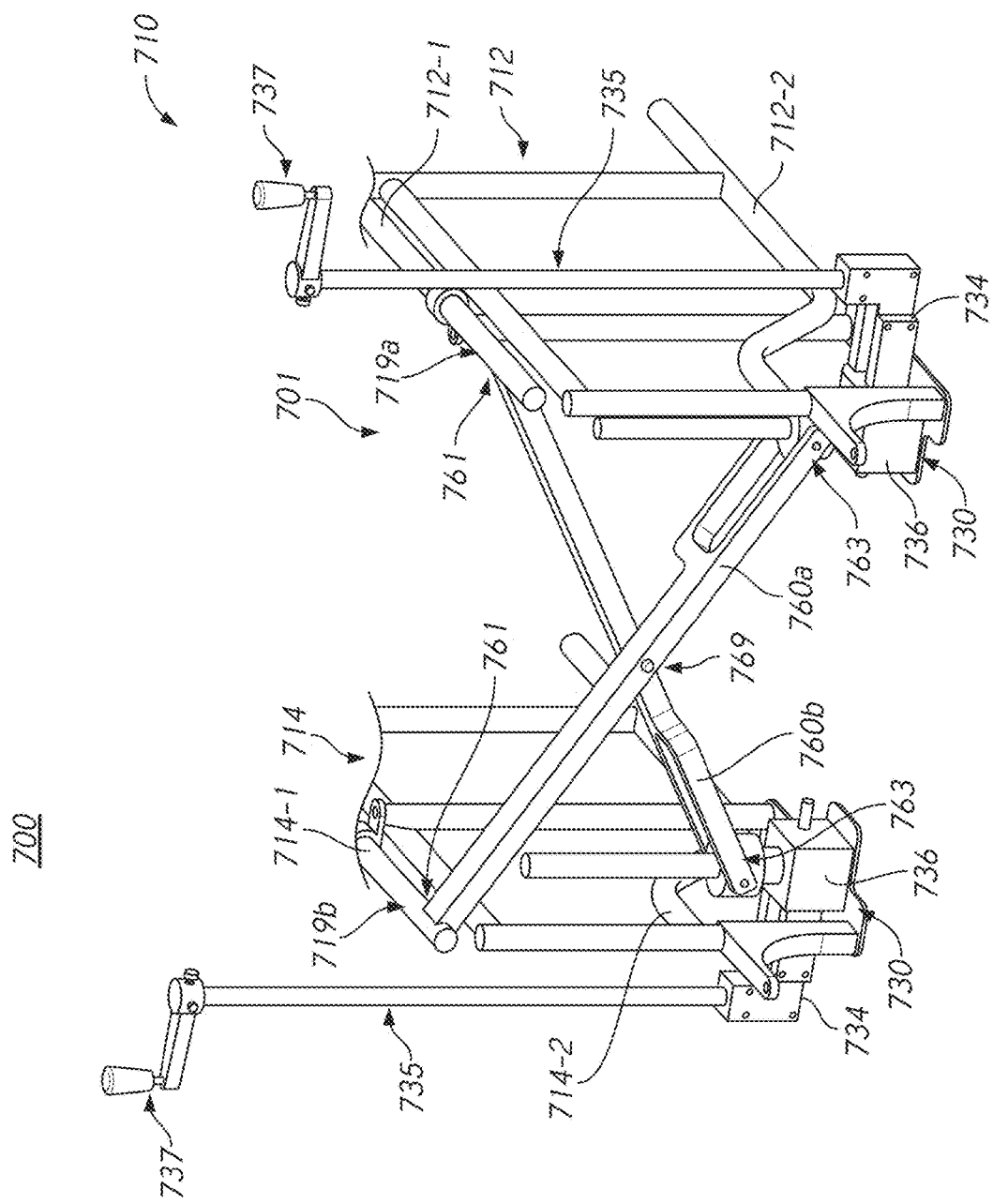
FIG. 7A illustrates a portion of the frame of a multifunction folding wheelchair in accordance with embodiments of the present disclosure.
Figure 7B:
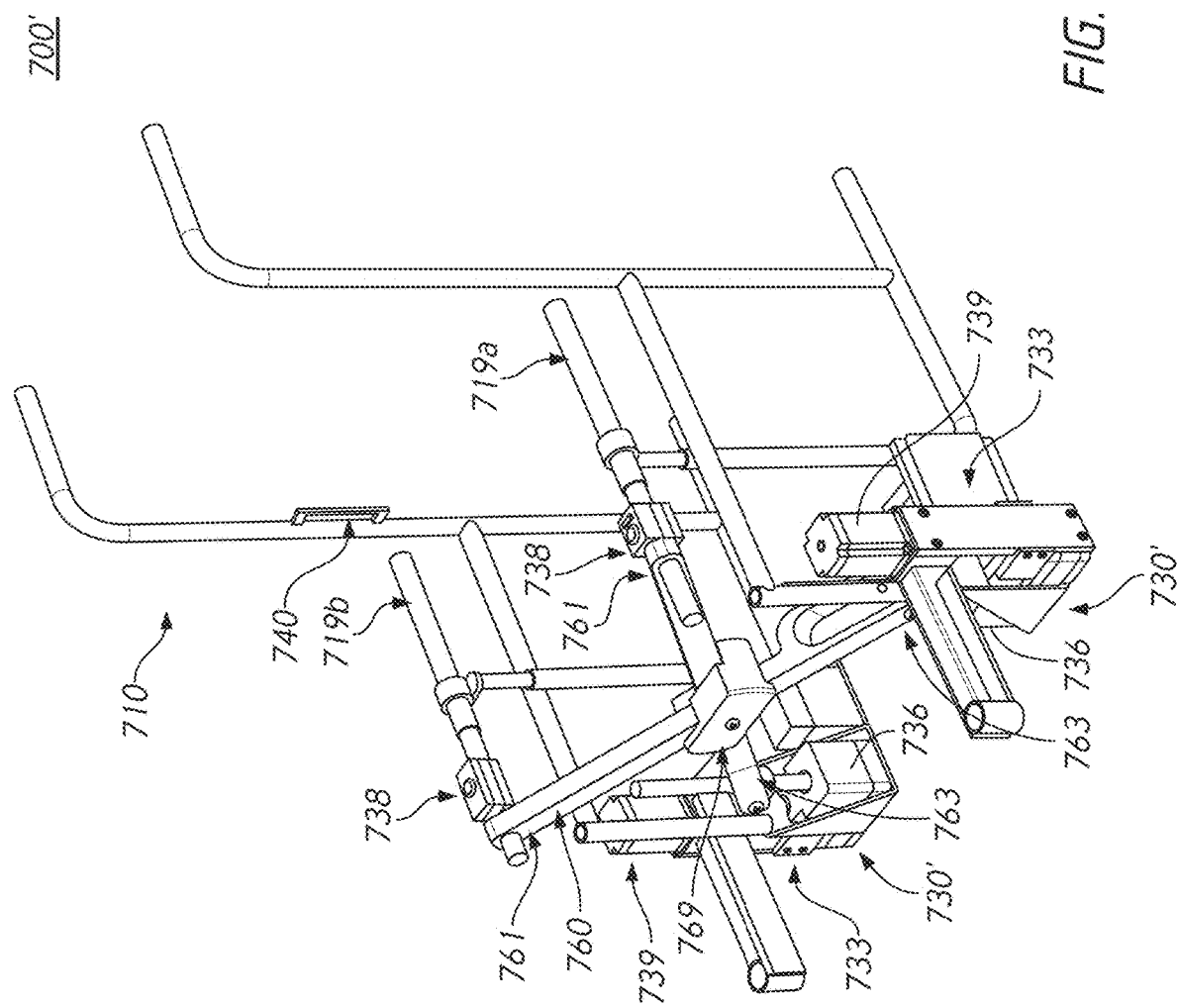
FIG. 7B illustrates a portion of the frame of a multifunction folding wheelchair in accordance with further embodiments of the present disclosure.
Figures 8A, 8B:
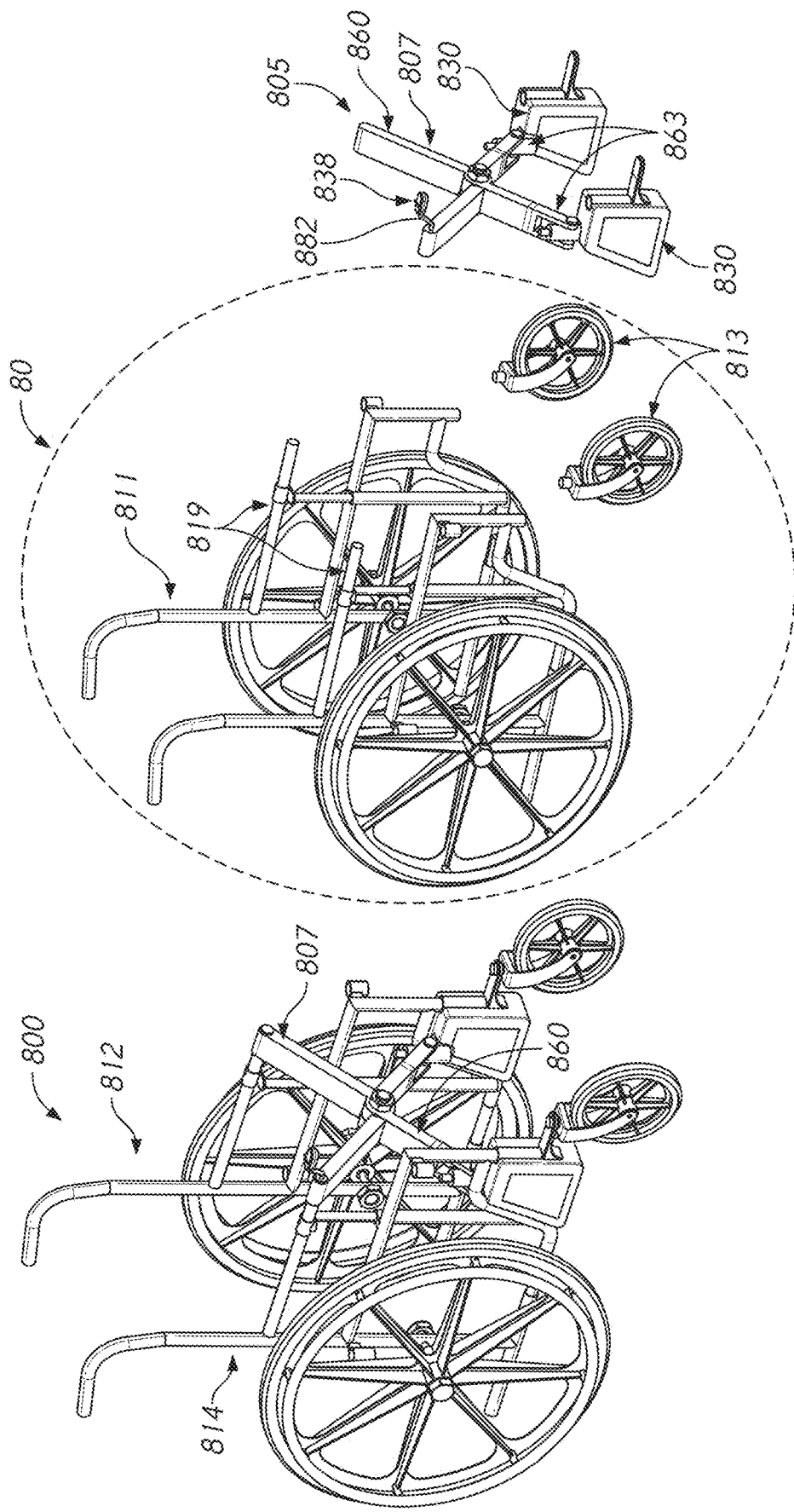
FIGS. 8A and 8B illustrate views of a modular unit for retrofitting a conventional folding wheelchair into a multifunction folding wheelchair, with the modular unit shown attached and separated, respectively, from components of the conventional wheelchair frame.
Figure 9B:
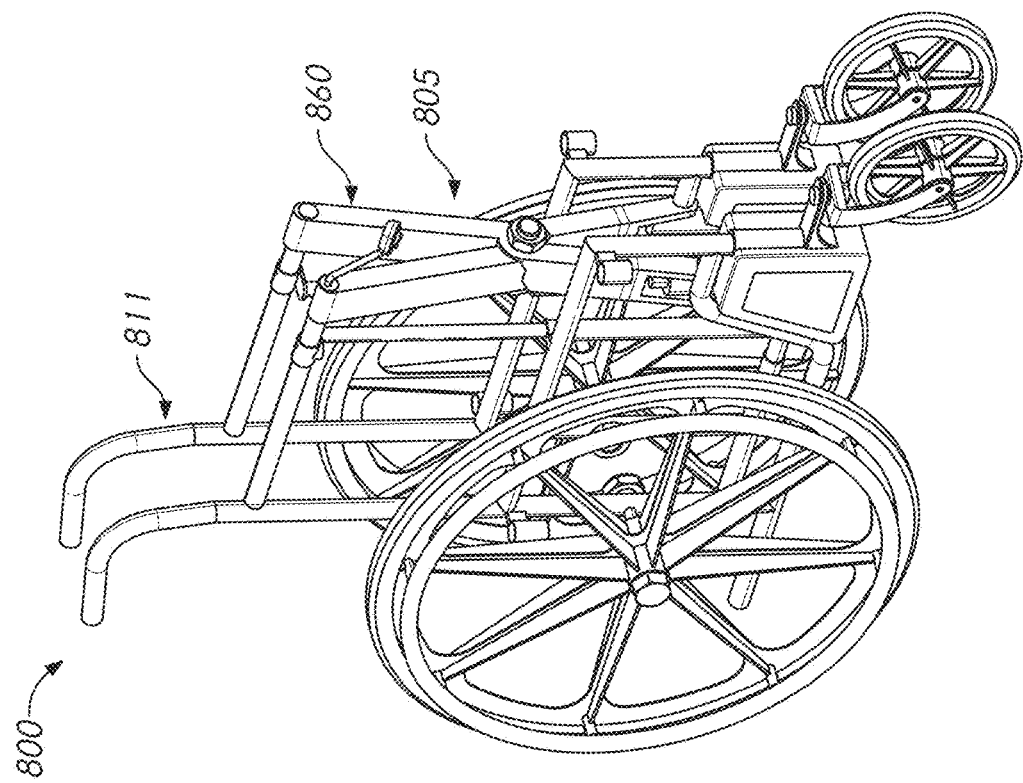
FIGS. 9A and 9B illustrate additional views of the retrofitted multifunction folding wheelchair of FIG. 8A, showing the multifunction wheelchair in unfolded and folded configurations, respectively.
Figure 9A:
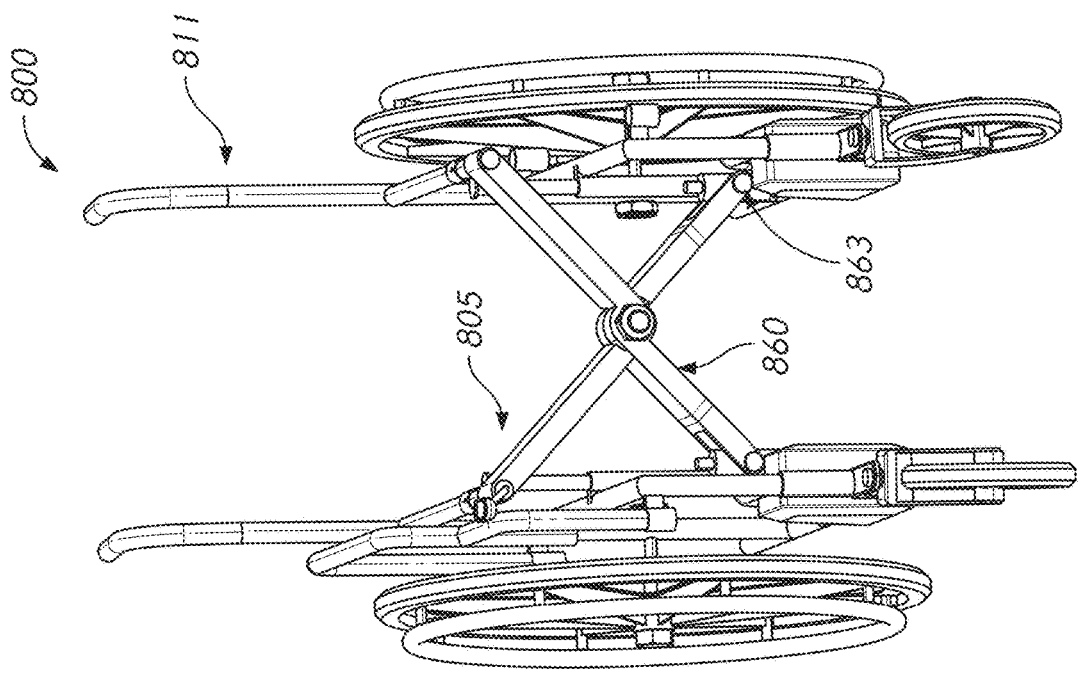

Referring to FIGS. 7A and 7B, in some embodiments, the cross-bar linkage 760 includes a pair of crossing bars or rigid member. This pair of rigid members include a first rigid member 760a having an upper end 761 connected to one of the seat rails (e.g., right seat rail 719b) near the front end of that seat rail, and a second rigid member 760b having an upper end 761 connected to the other one of the seat rails (e.g., left seat rail 719a), also at a location near the front end of that seat rail. Each of the rigid members 760a and 760b may be implemented using a beam (e.g., a rectangular tube, a cylindrical tube or tube having a different cross-sectional shape) or other rigid member of suitable configuration. While the suitable rigid members for the cross-bar linkage are not limited to hollow (i.e., tubular) members, and may instead be solid beams of various cross-sections, a tubular member may provide sufficient bending load capacity while keeping the weight of the linkage acceptable for portability.

The lower ends 763 of the rigid members 760a an 760b define the lower connection point of the moving frame that includes the upper portions 712-1 and 714-1 of the left and right frames 712 and 714, respectively. Thus, when raising and lowering the seat, the cross-bar linkage 760 is raised and lowered with the upper portions 712-1 and 714-1 and the seat.

The first and second rigid members are pivotally coupled at an intermediate location between the upper ends 761 and lower ends 763 thereof. The pivotal connection between the crossing bars 760a and 760b of the linkage 760, also referred to as folding joint 769, may be implemented using any suitable pivot joint (e.g., a pin joint that includes a pin or shaft passing through the pivot connection point of both of the links). In use, the seat rails 719a and 719b may be brought together, causing the rigid members 760a and 760b to pivot at the folding joint 769 to fold the wheelchair frame 710 (e.g., for storage and/or transport). In some such examples, the folding joint 769 may be held in the unfolded position, during use of the wheelchair, by the user's weight and, in some cases, optionally by a locking mechanism that prevents the folding joint 769 from being operated to the folded position. In some cases, the folding joint 769 may be operated through the use of a crank (e.g., hand crank 882 in FIGS. 8A-8B) which is coupled to the folding joint to actuate it between the unfolded state (see FIG. 9A) and the folded state (see FIG. 9B). One or more user control(s) 738, 838 may be co-located with the crank, such as provided on a surface of the crank (a surface that faces generally upward in the unfolded position but generally downward in the folded position). The user controls 738, 838 may include one or more buttons or switches that directly command/actuate an electronically actuated lit mechanism(s). In some embodiments, the user control(s) may include a button or switch that communicates, such as through a wired or wireless connection, to an electronics unit (e.g., a controller that commands the lift mechanism to a controller-estimated actuation state). As noted above, the cross-bar linkage 760 remains in the unfolded position and is actuated vertically while raising and lowering the seat with a user seated thereon.

The lift assembly of a folding multifunction wheelchair 700, 700' as shown e.g., in FIGS. 7A and 7B, includes two lift mechanisms 730, 730', respectively, each of which is operatively associated with a respective side (e.g., left and right sides) of the wheelchair frame 710. In the example in FIG. 7A, each of the lift mechanisms 730 includes an actuator 736, shown here as a worm-gear driven screw (also referred to as worm-drive), which is operatively associated via a gear assembly (or gear box) 734 and a rotatable rod 735, to a manual crank 737 conveniently positioned near the user's hands to allow the user to manually operate the lift mechanism(s) 730. A separate crank 737 is provided on each of the left and right sides of the frame and thus near each of the user's left and right hands so that the user can operate both cranks 737 simultaneously, with each hand, to raise and lower the seat. The gear box 734 on one side may mirror the one on the opposite side so that the left and right cranks 737 raise the lower connection points of the cross-bar linkage 760 or lower the lower connection points of the cross-bar linkage 760 when rotated in opposite directions. That is, one of the cranks 737 is rotated clockwise while the other crank 737 is rotated counter-clockwise for actuating the worm-drive in the same direction (e.g., up or down), for ease of use by the wheelchair user. In some embodiments, the lead screw of the worm drive may be a trapezoidal lead screw or other suitable screw that can withstand the loading of the seat and user while being rotated to raise or lower the seat and user. A trapezoidal lead screw may also reduce the risk of or essentially prevent "back drive."

The multifunction wheelchair 700' in FIG. 7B may have substantially the same arrangement of frame components, with the difference being that the worm drive 736 of each of the left and right lift mechanisms 730' is actuated electronically by a respective motor 733 (e.g., stepper motor) operatively coupled to a portable power source 739 (e.g., a rechargeable battery). One or more user controls 738, such as a hardware or software switch or button, may be provided proximate the seat, e.g., on or near a seat rail or on or near a handrail (not shown) of the wheelchair 700.

The transformation mechanism of a folding multifunction wheelchair 800 may be provided as a modular retrofit system or kit 805, e.g., as shown in FIGS. 8A-88 and 9A-98. As illustrated in FIGS. 8A-8B and 9A-9B, the transformation mechanism may be implemented as a small number (e.g., 2-3, in some cases up to 4) of retrofit components to simplify the process of converting an existing/conventional folding wheelchair 80 into a multifunction wheelchair 800. The kit includes a first component, specifically a modular unit 807 which replaces the crossing-frame members (not shown) of a conventional folding wheelchair 80. The modular unit 807 includes a cross-bar linkage 860 that may be implemented according to any of the examples herein, e.g. by cross-bar linkage 760. The lower connection points (or lower ends 863) of the cross-bar linkage 860 are connected (e.g., pivotally coupled) to respective left and right lift mechanisms 830 that provide actuation force for selectively raising and lowering the seat. The modular unit 807 is configured for easy attachment to the front ends of the seat rails 819 of a conventional folding wheelchair frame 811 to replace the standard crossing members of the conventional folding wheelchair 80 for converting it to a multifunction wheelchair 800. When the folding wheelchair is thus retrofitted with modular unit 807, the resulting folding frame includes frame members that enable the frame to fold while all frame members and other components of the transformation mechanism, remain outside of the under-seat cavity (e.g., cavity 701). Additionally, the retrofit kit 805 may include a replacement seat (e.g., 1000 in the example in FIG. 10) to replace the conventional seat provided with a conventional folding wheelchair 80. Other component(s) of the modular retrofit kit may include a pair of front wheels, which may be provided to the end user separate from or assembled to the modular unit 807. In some embodiments, the modular unit 805 may be configured for use with the existing front wheels 813 of the conventional folding wheelchair 80, which may be assembled to the modular unit 807 instead of the components of the conventional frame replaced by the modular unit. In this manner, a retrofit kit 805 (e.g., modular unit 807 of FIGS. 8A-8B and 9A-9B and replacement seat 1000 of FIG. 10) may be used with existing components (e.g., side frames 812, 814 of a conventional folding wheelchair frame 811) to provide a multifunction wheelchair 800. While the kit 805 show a modular unit 805 configured with electronically actuated lift mechanisms, in other embodiments the modular unit may be configured with a pair of manual cranks for manual actuation, similar to the example in FIG. 7A. In some embodiments, the kit may also include the seat rails, which may be pre-installed to the cross-bar linkage and the replacement seat such that replacing the existing crossing members of the conventional folding frame also replaces the seat rails and seat. As noted above, the retrofit kit includes the lift assembly, which in some instances are pre-installed to the cross-bar linkage. The lift assembly can be implemented in accordance with any examples herein, e.g., using a worm drive which is either manually powered (by the user) or power by an actuator in cooperation with a portable power source (e.g., a battery driven motor). The lift assembly is configured to be driven by a reasonable user input. For example, if the lift assembly is operated by manual force, the mechanical components transmitting the manual force of the user to the lift mechanism(s)(e.g., worm drive(s)) that lift the lower ends of the cross-bar linkage provide sufficient mechanical advantage such that the lift assembly can be operated without excessive strain on the upper extremities of the user. A suitable gear assembly can be used to effectively transmit the manual force of the user (e.g., rotation of a crank) to actuation of the lift assembly. In embodiments in which the lift assembly powered by a portable external power source, for example when using electrical motors, each motor may be associated with a rechargeable battery (e.g., a 24V, 7 A battery) collocated with the respective motor.

In some embodiments, the lift assembly for a folding multifunction wheelchair may be implemented using left and right scissor lifts similar to those describe with reference to FIGS. 5A and 5B. Such configuration may be used when manufacturing the folding multifunction wheelchair (i.e. prior to deliver to an end user) or may be provided as modular kits for reconfiguring and existing wheelchair frame. For example, and referring to FIG. 18A, the left and right frames 1812 and 1814 of an existing folding frame, instead of being assembled to the crossing members of the folding frame, are each coupled to a modular unit 1807, which in this example is provided below the lower horizontal members of the existing frame. The modular unit 1807 may include, on each of the left and right sides, a respective lift mechanism including an upper frame member or beam 1815 and a lower frame member or beam 1813 which are spaced apart (e.g., in a generally parallel arrangement) and operatively coupled to one another by a respective left or right scissor lift 1830. The existing frames (e.g., left and right frames 1812 and 1814) connect to the upper beam 1815 of the respective lift mechanism, and once so connected the upper beam 1815 become part of the upper moving portion of the wheelchair frame. Each of the scissor lifts 1830 may be implemented by any suitable scissor lift, such as but not limited by scissor lift 500 or 550. The modular unit 1807 may also include a bendable transverse member 1809 that connects the left and right lift mechanisms and whereby the left frame and right frames 1812 and 1814 are movably coupled once assembled with the modular unit 1807. The bendable transverse member 1809 may be implemented using any suitable flexible elongate material that can carry the tensile loads applied to it (e.g., due to the weight of the user applied to the seat) during use. Suitable flexible elongate materials may include a rope, cable(s), belt, chain, or elastomeric strap having sufficient tensile strength (e.g., a rubber strap of sufficient durometer) to hold the lower ends of the left and right frame 1812 and 1814 together and prevent the frame from splaying open when a user is seated onto the seat. The bendable transverse member 1809 resiliently bends when the left and right frames 1812 and 1814 are brought together to enable folding the wheelchair frame and returns to its elongate shape when the frame is unfolded. In another embodiment, the modular system may include a first component that provides a replacement cross-bar linkage 1860 configured to couple to the front end of the wheelchair frame (e.g., to left and right frames 1812 and 1814), and first and second scissor lift assemblies 1840-1 and 1840-2, each configured to couple to the lower frame members of the left and right frames 1812 and 1814. The scissor lift assemblies 1840-1 and 1840-2 may each be associated with an actuation mechanism, e.g., a manual crank 1837 as in FIG. 18B or electrically powered worm drive. The scissor lift assemblies 1840-1 and 1840-2 may each be implemented using any suitable scissor lift, including but not limited to the scissor lift 500 in FIG. 5A or the scissor lift 550 in FIG. 5B. Various other combinations may be used to implement an operative arrangement of lift mechanism(s) with a folding frame to provide a transformation mechanism for a multifunction folding wheelchair which can lift and lower the seat vertically without substantially changing the relative horizontal position of the seat to the non-moving base.

Another component of a retrofit kit may be a replacement seat operable to be easily reconfigured between normal, ergonomic use and toilet-use configurations. A wheelchair seat with a permanent hole leaves the risk of health issues developing, such as hemorrhoids and pressure sores. Thus, the temporary creation of an open aperture in the seat in accordance with examples herein for use of the multifunction wheelchair in the second configuration, when positioned over the toilet, may alleviate such concern such as by minimizing health risks by adequately supporting the user's pelvic floor when it is not in active toilet use, but can be selectively opened for toilet use. Pressure sores, which are caused by "injuries to skin and underlying tissue resulting from prolonged pressure on the skin" are prevalent in wheelchair patients. Pressure is focused on points where bones protrude (tailbone, hips, etc.) and can be reduced by reducing the maximum pressure. Uneven support in seating can lead to issues with blood flow, which can cause hemorrhoids. Sitting on a permanent hole for a long time has been linked to a higher prevalence of hemorrhoids. A seat that is reconfigurable between ergonomic use and toilet-use configurations may be provided, e.g., as part of a retrofit kit including the modular unit, as a replacement seat to replace the flexible (leatherette or woven fabric) seat of a conventional folding chair. Referring back to FIG. 10, shown there is an example seat 1000 for a folding multifunction wheelchair (e.g., wheelchair 800 in FIGS. 8A-B and 9A-B). The seat 1000 may be a replacement seat, e.g., part of a retrofit kit such as kit 805, or it may be provided/installed on a folding multifunction wheelchair as delivered to an end user. The seat 1000 has a multi-layer seat member 1002 made from any suitable flexible material (e.g., leather, faux leather or leatherette, tightly-woven fabric, or another type of fabric made of any suitable synthetic or natural materials). The seat 1000 includes first seat member 1010 including one or more plies of support material) which defines an opening or cutout 1012. The seat 1000 includes a second layer (e.g., second seat member 1020) which is movable relative to the first layer such that it can be repositioned independent of the first layer while the first layer remains attached to both seat rails 1003a and 1003b of the wheelchair. The second layer (e.g., second seat member 1020) includes support material at least across the area of the cutout in the first layer so as to fill or cover the opening 1012. In some embodiments, the first and second layers are substantially coextensive, that is both cover about the same area of the seat.

The opening 1012 may be located generally centrally, while the second layer is devoid of any such opening. As such, when the second layer is provided in the closed position, the second layer substantially fills or extends across (e.g., over or under) the opening to more fully support the body (e.g., pelvic floor) of the seated user. The first layer (e.g., first support member 1010) is attached to the frame of the wheelchair by attaching a first edge 1013a to the first rail 1003 and the second edge 1013b to the second rail 1003b using any suitable means (e.g., fasteners 1015) so that the first layer (e.g., first support member 1010) remains attached to the frame when the second layer is moved between the opened and closed positions. The second layer may have corresponding first and second edges 1023a and 1023b, and only one of the edges (e.g., edge 1023b) may be fastened to a seat rail (e.g., rail 1003b) to remain fixed to the rail in use. The other edge (e.g., 1023a) may be removably fastened, such as with clips, hooks, magnetic closures or other suitable means, in proximity to the respective rail (e.g., rail 1003a) to allow the second layer to be repositioned independent of the first layer, such as by folding it toward the opposite edge. The second layer (e.g., second seat member 1020) may be provided over the top side of the first layer, as shown in FIG. 10, or it may be movably and operatively coupled under the first layer (e.g., using a roll-up mechanism) to prevent the second layer from dropping into the toilet bowl when opened. Also, while the first and second layers are shown attached to one another along one of the lateral edges, in other embodiments, the two layers may be attached along a different edge such as the front or rear edges, especially in embodiments in which the second layer is below the first layer.

Figure 11:
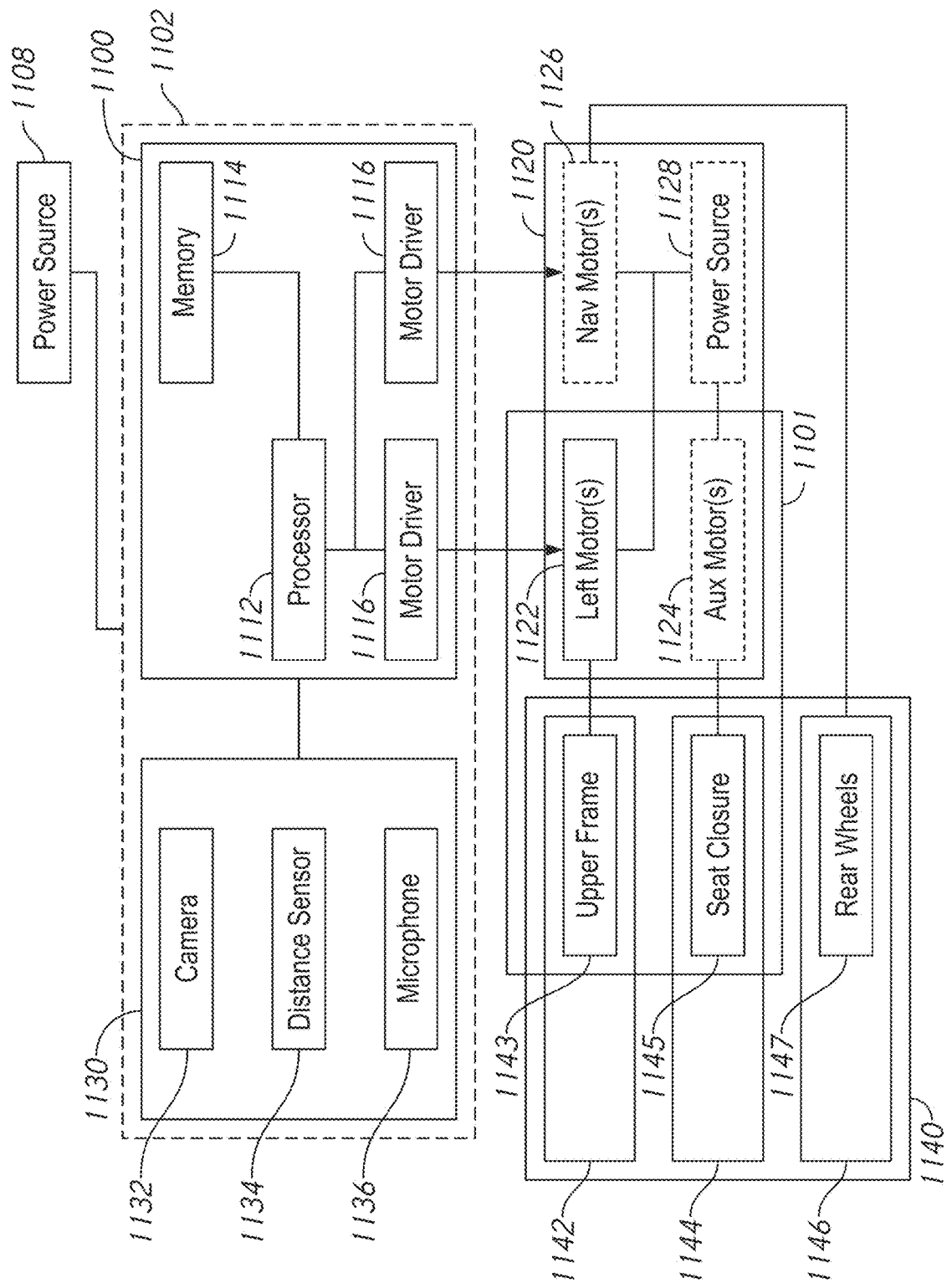
FIG. 11 is a block diagram of an electronic controller of a multifunction wheelchair in accordance with some examples of the present disclosure.

As described above, a multifunction wheelchair according to the present disclosure, whether of the fixed-frame or folding-frame design, may be equipped with electronics such as for operating an electronically-controlled lift assembly. FIG. 11 shows a block diagram of an electronically controlled wheelchair system 1000. The wheelchair 1140 may be implemented according to any of the examples herein (e.g., wheelchair 100, 400, 700, 800). Accordingly, the wheelchair 1140 may include a transformation mechanism 1101 which enables the wheelchair 1140 to be easily reconfigured between an ergonomic use configuration and a roll-over-toilet configuration while the user remains seated on the wheelchair. In accordance with the examples herein, the wheelchair 1140 includes a frame 1142, an upper portion 1143 of which is movably coupled to a lower portion thereof by one or more lift mechanisms (e.g., lift motor(s) 1122). The frame supports a seat 1144 which includes a through opening that exposes the under-seat cavity. The upper frame 1143 may be raised, by the lift mechanism(s) and while the lower-portion of the frame and wheels 1146 remain in contact with the ground, to raise and lower the seat 1145 and thus increase the height of the under-seat cavity when a taller western-style toilet is to be accommodated therein.

The seat 1144 is operatively associated with a seat closure 1145. The seat closure 1145 may be provided in an open position for use of the wheel chair in the roll-over-toilet configuration and a closed position for normal use during the majority of the wheelchair user's day. The seat closure may be actuated between the open and closed position by manual force or by an electrical motor or other suitable actuator. In some embodiments, a separate motor (e.g., auxiliary motor 1124) from the motors/actuators that power the lift mechanism may be used to actuate the seat. As such, the wheelchair may include one or multiple actuators 1120 operatively arranged on the frame to provide the desired function. As described, the wheelchair includes one or more lift mechanisms (e.g., lift motor(s) 1122). The wheelchair may include one or more auxiliary motors 1124 which may be configured to actuate the seat closure. The wheelchair may include one or more additional motors 1126 operatively associated with the rear wheels 1147, and also referred to as navigation or steering motors 1126, used by the wheelchair to steer/align the wheelchair to the toilet. The navigation motors 1126 may be implemented by a respective hub motor at each of the two rear wheels 1147. The actuators 1120 may be powered by one or more portable power sources 1128. For example, each of a pair of electrically powered lift motors associated with each of the left and right sides of the frame may be powered by a respective battery, which may be a 24V, 7 A rechargeable battery.

In the example in FIG. 11, the operation of the transformation mechanism 1101 may be at least partially automated. For example, the lift assembly (e.g., lift motors 1122) may be controlled by an electronic controller 1110. The controller 1110 is in communication with one or more input devices 1130, e.g., a camera 1132, one or more distance sensors 1134, and one or more user input devices, which may include one or more switches or buttons, either hardware or GUI-based, and/or a microphone 1136. The controller 1110 may include a processing unit or processor 1112, which may be implemented by a microcontroller or other ASIC, an FPGA, or a microprocessor, which may be programmed, via executable instructions, that may be stored in an onboard memory 1114 (e.g., any suitable non-volatile memory such as flash memory). The processor 1112 may thus be configured to perform the functions and computer-implemented processes described herein. The processor may be configured to generate commands for controlling, e.g., via respective motor driver(s) 1116, the one or more actuators (e.g., the lift motor(s) 1122 and auxiliary motor(s) 1124) and thereby actuating the transformation mechanism 1101. The controller 1110 communicates with camera 1132, which is operatively positioned to obtain images of the environment behind the wheelchair 1140. The camera 1130 may be positioned on the rear side of the wheelchair frame 1142 or otherwise operatively arranged to face away from the rear side of wheelchair 1140. Images captured by the camera 1132 are processed by the controller 1110 for navigation control (e.g., steering the wheelchair into alignment with the toilet), toilet seat height estimation and/or wheelchair seat-height adjustments. In some embodiments, the processor 1112 is programmed to perform a height estimation process, described further with reference to FIGS. 15-16. A portable power source 1108, such as a 9V, optionally rechargeable, battery, provides power to the controller 1100. In some embodiments, the power source 1108 is integral with the controller 1100. It will be understood that a processor 1112 may include one or a plurality of processors operatively configured to perform the functions described herein with reference to processor 1112. In some embodiments, one or more aspects of the image processing of images obtained by camera 1132 may be performed by a processor which is integrated with the image sensor of camera 1132, thereby providing a self-contained module including the camera and certain image processing functions In some embodiments, the controller is in communication with one or more distance sensors (e.g., ultrasound sensor, radar, Lidar, laser rangefinder, IR-based or other optical sensor, etc.) suitably arranged on the frame 1142 to measure the distance between the camera 1132 and the ground and/or between the wheelchair 1140 and the toilet. Distance measurements obtained by distance sensor 1134 are used, in some embodiments, by the processor 1112 in the toilet height estimation process and/or wheelchair-toilet alignment process. In some embodiments, reconfiguration of the wheelchair 1140 between the first configuration (e.g., as shown in FIG. 1) and the second, raised configuration (e.g., as shown in FIG. 2) may be initiated responsive to a user input. The user input may be received via the one or more input devices 1130. For example, the user input may be a push, toggling or selection of a button (e.g., a physical switch or button, or a GU/software control) suitably arranged on the frame to enable manipulation by the user while seated. In some embodiments, the controller 1100 may alternatively or additionally be configured to receive user input in a touchless manner, such as through voice commands detected by microphone 1136. The processor 1112 may be configured to recognize one or more predetermined voice commands, such as "toilet," and perform one or more of its functions responsive to the detected command. In such embodiments, the processor may be configured to perform voice recognition by monitoring and/or processing vocal utterances of the user when certain conditions are met. Various voice recognition techniques have been developed, the particulars of which are outside of the scope of the present invention.

Figure 12:
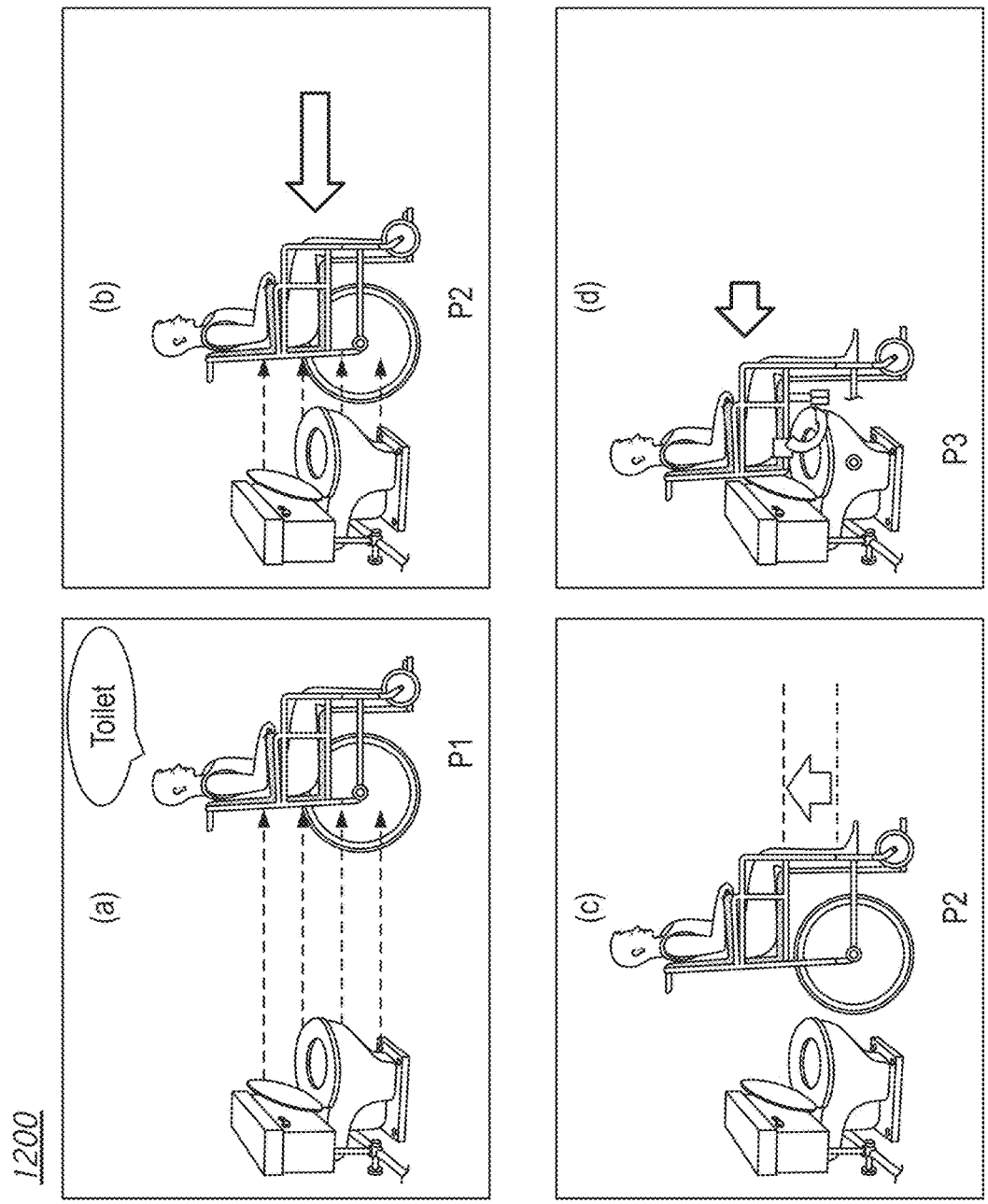
FIG. 12 is an illustration of a transformation process of a multifunction wheelchair in accordance with examples of the present disclosure.

The operation of a multifunction wheelchair according to some embodiments is described further with reference now also to FIG. 12, which shows an example method of transforming a wheelchair to a roll-over-toilet wheelchair in accordance with some examples herein. One or more of the steps of this method may be omitted or performed in a different order in other embodiments. The method 1200 includes providing the multifunction wheelchair 1140 in front of a toilet with a rear side of the wheelchair 1140 facing the toilet, as shown in box (a). The wheelchair 1140 may be implemented using any of the examples herein (e.g. by wheelchair 100, 400, 700, etc.). The wheelchair includes a frame 1142 that has left and right frame portions spaced apart from one another to define a cavity of sufficient width, across a depth of the cavity, to accommodate a western-style toilet therebetween. The wheelchair's seat 1144 is supported above the cavity by the left and right frame portions so as to extend across the width of the cavity. The seat 144 has an opening and a seat closure 1145 that can selectively provide the opening between an opened (or exposed) state, as shown in box (d) of FIG. 12, or in closed (or concealed) state, as in boxes (a)-(c) of FIG. 12. As described, the left and right frame portions each includes an upper portion or frame assembly (e.g., upper frame 1143) and a lower portion or frame assembly that remains in contact with the ground, via the wheels 1146, at all times. The left and right upper portions are movably coupled to their respective left or right lower portion, in some cases by a respective lift mechanism (e.g., lift motor 1122). The respective lift mechanism(s) are located primarily, and are in some cases fully contained, on the respective side of the frame. The lift mechanism(s) are arranged on the frame so as to remain outside of the cavity when the wheelchair in the roll-over-toilet configuration.

The wheelchair 1140 may also include onboard electronics that include an electronic control module (e.g., controller 1100) communicatively coupled to a camera 1132, one or more distance sensors 1134, a microphone 1136 and/or other user input devices, or any combination thereof, to control the transformation of the wheelchair between the first (i.e. ergonomic) and second (i.e. roll-over-toilet) configurations. The camera 1132 may be operatively positioned on the frame to face away from the rear side of the wheelchair 1140 so as to capture images of the environment behind the wheelchair 1140. As shown in box (a) of FIG. 12, the wheelchair 1140 is initially in a first position P1 in front of the toilet. The control module, if equipped with voice recognition, may detect a voice command (e.g., "toilet" or other predetermined word or phrase in English or a foreign language) and initiate an alignment (see boxes (a) and (b)) and transformation (see boxes (c) and (d)) processes. The alignment process may involve automatically steering, by the controller 1100, the wheelchair 1140 to a position in which the wheelchair 1140 it is substantially centered with respect to the toilet bowl. During this process, the wheelchair 1140 may be repositioned (e.g., under automated navigation by processor 1112 and steering control by navigation motors 1126) to a second position P2 in front of the toilet (box b) which is closer to the toilet than the first position P1. Input from the distance sensor(s) and camera, e.g., as describe further below with reference to FIGS. 13-14, may be used for automated navigation of the wheelchair 1140 (e.g. wheelchair-toilet alignment). In some embodiments, the wheelchair 1140 may not be equipped with automated navigation control and in such embodiments, the user may manually steer and position the wheelchair into the second position P2.

The wheelchair may then initiate a transformation process, either automatically upon determination of the processor 1112 that the wheelchair is sufficiently aligned/centered and positioned in sufficient proximity to the toilet. In other embodiments, the transformation process may be initiated responsive to a further voice command or other user input (e.g., push of a button). As shown in FIG. 12, the transforming of the wheelchair 1140 into the roll-over-toilet configuration includes raising the seat 1144, as shown in box (c), and opening the seat closure 1145, as shown in box (d), some or all of which may be automated by being under electronic control and/or power. In some embodiments, at least part of the transformation (e.g., the lifting of the seat and/or the opening of the seat closure) may be manually activated and/or manually powered. After raising the seat as shown in box (c), the wheelchair 1140 is further advanced toward the toiled from position P2 to position P3 in which the seat of the wheelchair is operatively positioned over the toiled (e.g., with the opening in the seat over the toilet bowl, and which may be achieved under autonomous navigation or manually. In some embodiments, the seat closure 1145 may be opened after the wheelchair 1140 is positioned at P3. In some embodiments, the seat closure 1145 may opened while the wheelchair 1140 is at another position such as at position P2. In some such embodiments, the seat closure 1145 may open automatically as a result of lifting of the seat, for example during the lifting of the seat or as a result of a condition associated with the lifting of the seat (e.g., completion of lift, initiation of lift, etc.). As described, in embodiments in which the seat 1144 is raised under electronic control, the wheelchair 1140 is equipped with onboard intelligence enabling the wheelchair to estimate the height of the toilet seat and thus determine the height to which the upper frame 1143 and seat 1144 are to be raised. The wheelchair 1140 is further configured to reverse the transformation process, during which the wheelchair is returned to a position in front of the toilet (e.g., position P2) and re-configured to the ergonomic use configuration, which again may occur with full or partial automation. In some embodiments, the automated alignment process may be omitted and alignment of the wheelchair may be performed manually (by the user). In some embodiments, the raising of the seat may be omitted.

Figure 13:
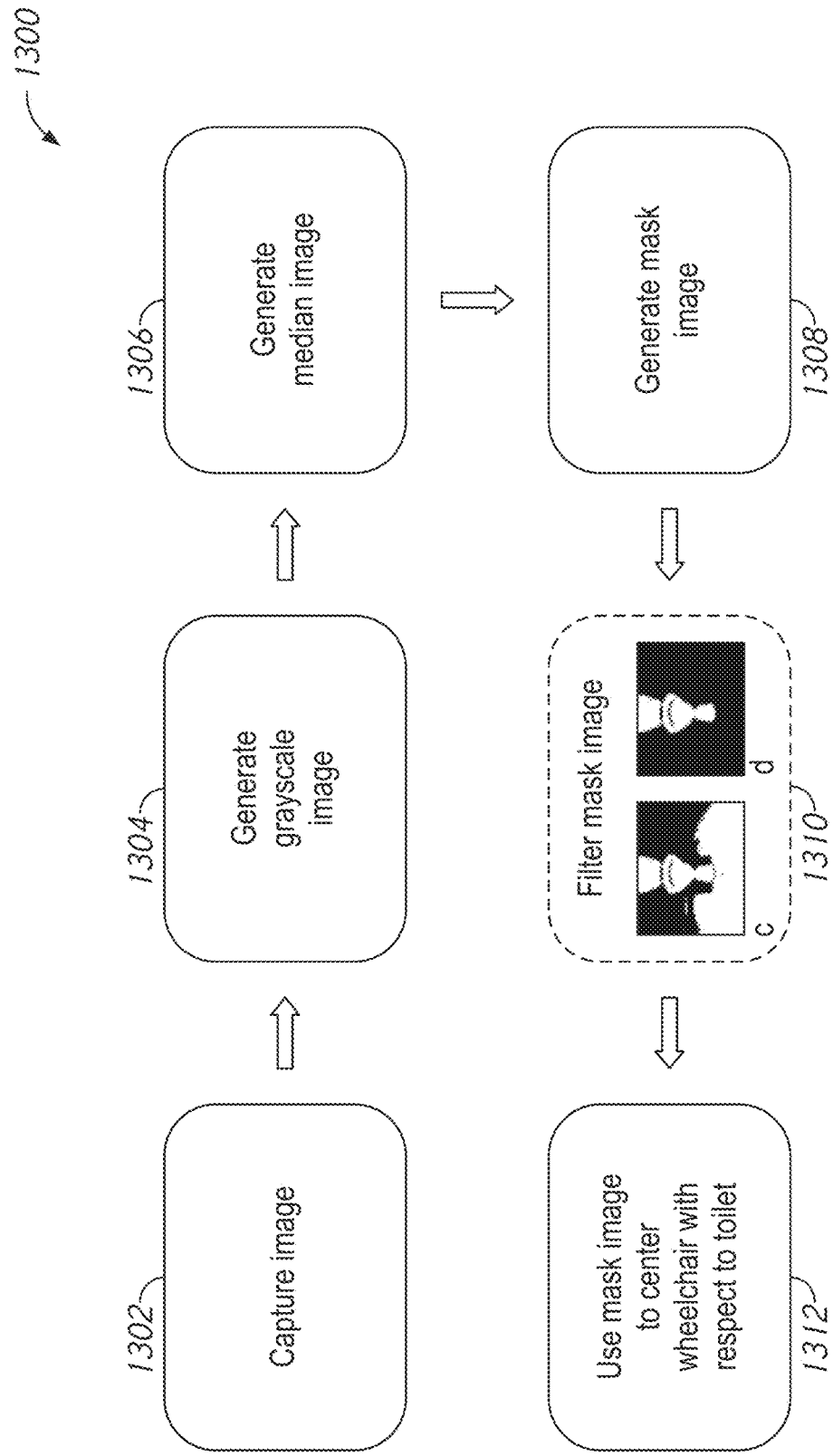
FIG. 13 is a block diagram of processor-implemented method for centering a smart multifunction wheelchair to a toilet in accordance with embodiments of the present disclosure.

FIG. 13 shows a flow diagram of an example process that uses a color difference method for aligning or centering the wheelchair 1140 with respect to the toilet. The process 1300 may be implemented by a processor 1112 of the multifunction wheelchair 1140 as part of the transformation process descried above. Referring to FIG. 13 and also to the example images in FIG. 14, the process 1300 begins at block 1302 by capturing an image of the toilet. One or more images are captured after the wheelchair is initially positioned in front of the toilet with the rear side of the wheelchair facing the toilet so that the obtained by camera 1132 include the toilet. Depending on the type of camera used, the image of the toilet may be a color image or a grayscale image (e.g., see frames 1401 in the first column of FIG. 14). If the image is a color image, the process 1300 may include converting the image to a gray scale image (see block 1304), examples of which are shown in the first column of FIG. 14. Next, using a color difference method, the position of the toilet in the image may be detected. For example, the process 1300, at block 1306, may include generating a background model (e.g., a median image) using a median method. In the example in FIG. 14, the median image is an image in which all pixels are assigned the same grayscale value, namely the median value between the minimum and maximum grayscale values of the grayscale image (e.g., the respective frame 1401 in the first column of FIG. 14). Next, a mask image is generated, as shown in block 1308, examples of which are provided in the third column (binary mask images 1405) of FIG. 14. A binary mask image may be generating using a thresholding process. For example, the mask image may be a binary (e.g., black and white) image, where one of two values is assigned to each pixel based on the equation below:

$$\text{Mask} = \begin{cases} 1, & |\text{Image} - \text{Med}| > \text{Threshold} \\ 0, & \text{otherwise} \end{cases} \quad \text{(equation 1)}$$

where "Image" is the grayscale value at a given pixel of the grayscale image, Med is the value at the same pixel of the median image (e.g., the median value), and Threshold is a predetermined value, in this case between 0 and 1. Different binary values or other suitable techniques for generating a mask image may be used. In some cases, as shown in block 1310, the mask image (image (c) in block 1310) may be optionally filtered to remove noise from the image and produce a filtered mask. In a next step, as shown at block 1312, the mask image (e.g., the raw mask image or the filtered mask image) is used by processor 1112 to determine if the toilet is centered within the camera's field of view (e.g., within the image), for example by comparing the distance between the left and right sides of the toilet bowl and the left and right edges of the image, based on which and the position, whether centered or at a known off-center position on the wheelchair frame, the alignment of the wheelchair with respect to the toilet can be determined. That is, at block 1312, the processor may generate navigation commands that are configure to correct for misalignment between the wheelchair and the toiled and the process 1300 is repeated, as the wheelchair is advanced toward the toilet (from position P1 to position P2), until it is determined by processor 1112 that the wheelchair is substantially aligned with the toilet. As such, multiple frames (i.e., images) are captured during the wheelchair-toilet alignment process, for example capturing a frame (i.e., image) each time a steering command and corresponding position adjustment is made to confirm whether the wheelchair is substantially centered with respect to the toilet. The process 1300 may terminate upon determination that the wheelchair is substantially centered with respect to the toilet.

Figure 14:
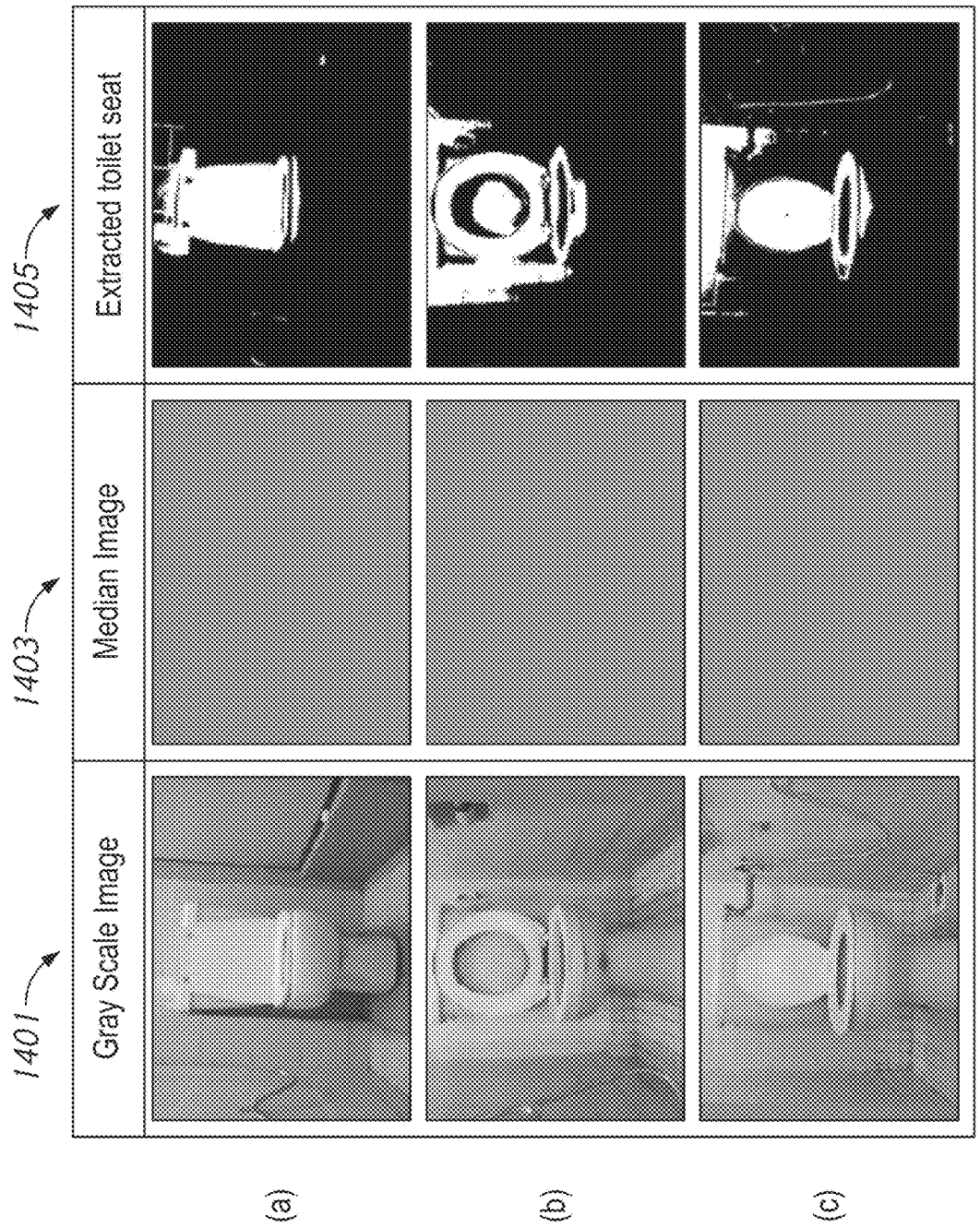
FIG. 14 shows examples of images generated by the method of FIG. 13.

FIG. 14 shows three examples (rows (a), (b), and (c)) of frames 1401, which were captured by the camera. After image capture, a background model (e.g., image 1403 is then created, in each instance, using the median method. The third column shows the images of the toilet obtained by subtracting the background from the new frame after thresholding using, for example using equation (I) above. The method does not directly establish the location of the toilet, but can be used to quickly identify the region of the image that can be used to center the wheelchair to the toilet. The received information is used to steer the wheelchair within a predetermined range.

Figure 15:
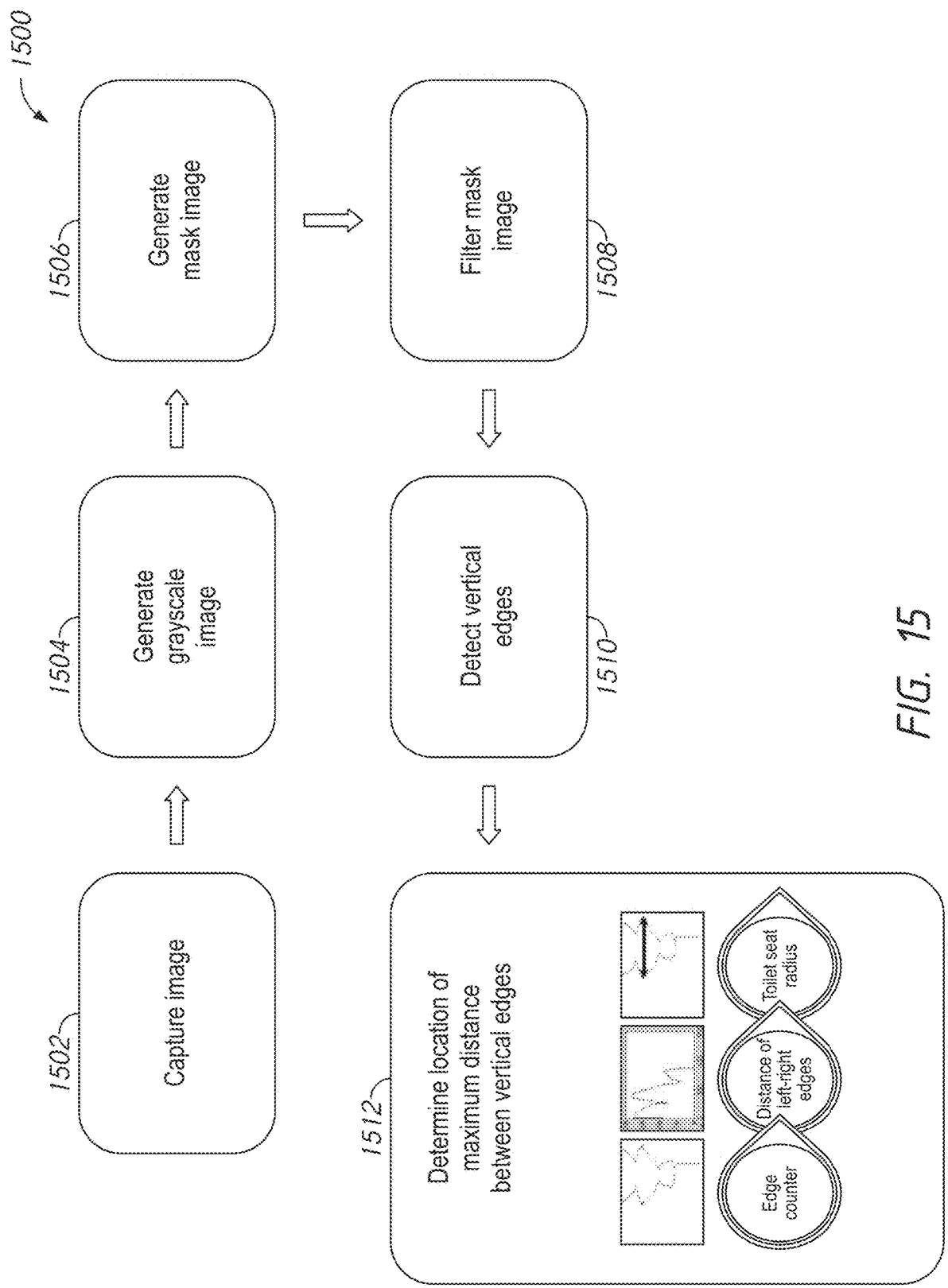
FIG. 15 is a block diagram of processor-implemented method for estimating a toilet seat height for use during a transformation process of a wheelchair in accordance with embodiments of the present disclosure.
Figure 17A:
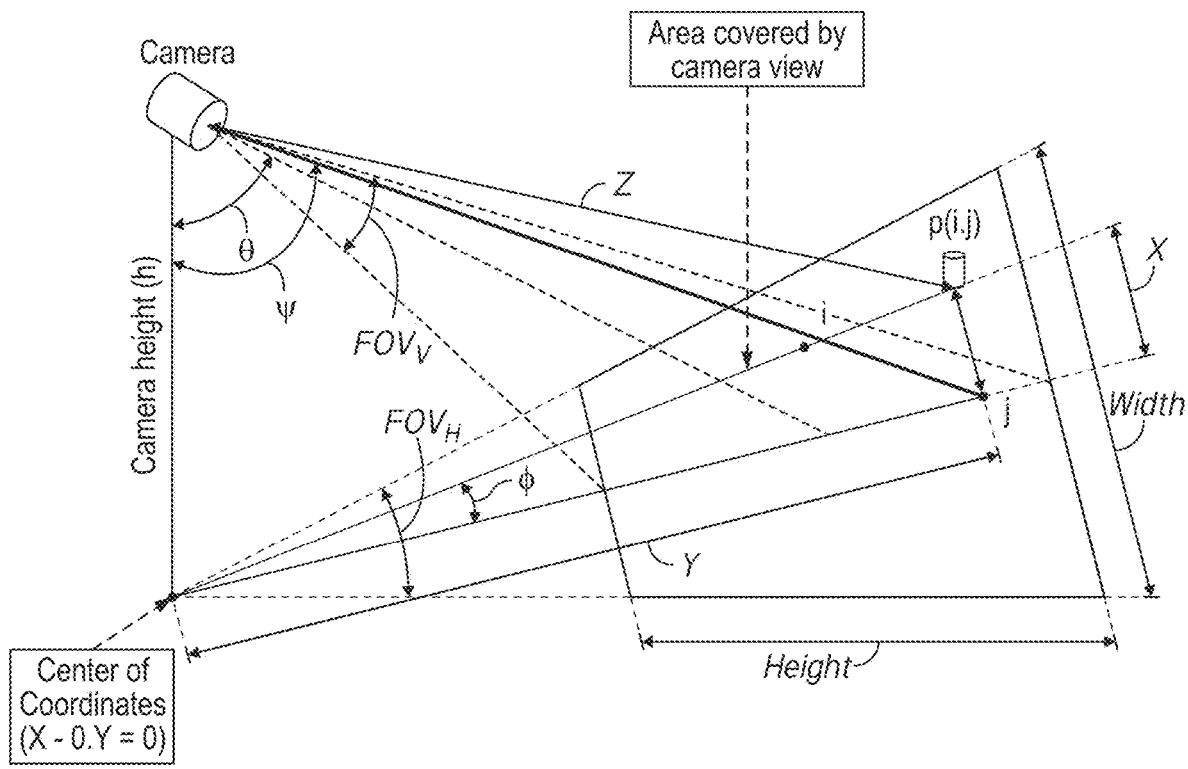
FIGS. 17A and 17B illustrate aspects of a processor-implemented method for triangulating the position and estimating the toilet seat height from images acquired by the multifunction wheelchair in accordance with embodiments of the present disclosure.
Figure 17B:
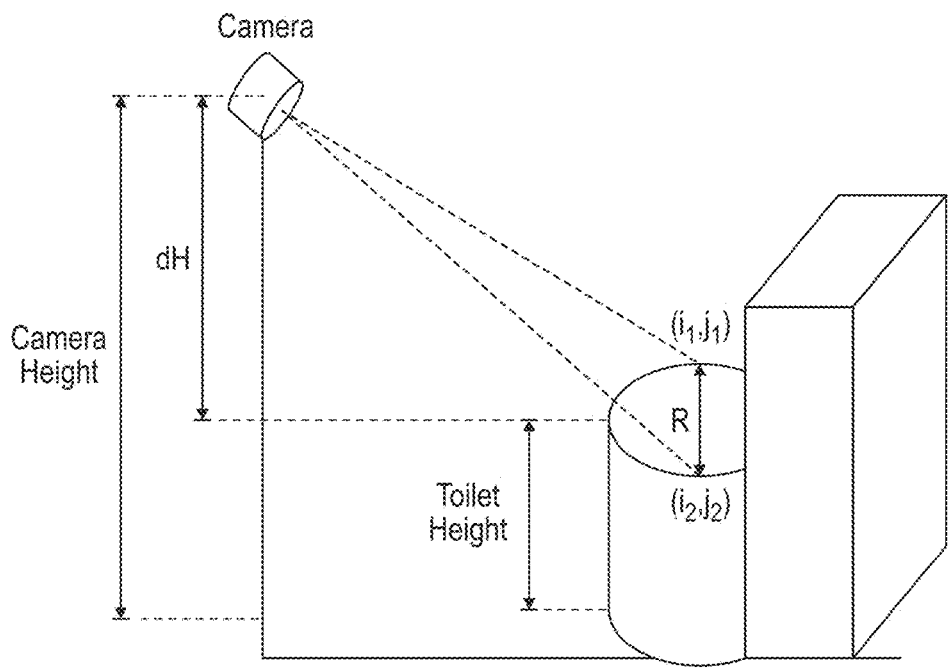

FIG. 15 shows a flow diagram of a process 1500 for estimating the toilet seat height which may be implemented by processor 1112, e.g., as part of an at least partially automated transformation process of wheelchair 1140. FIG. 16 shows examples of images generated by process 1500, and FIGS. 17A and 17B illustrate aspects of the triangulation and toilet seat height estimation process that may be performed as part of the process 1500. Morphological filtering may be used to locate the generally circular top of the toilet seat in the mask image extracted from the alignment process. The generally circular top may be extracted from a mask (e.g., binary) image based on the toilet seat's vertical edges. These edges represent the approximate radius of the generally circular top with better consistency. As shown in FIG. 15, the process 1500 involves capturing an image (block 1502), generating a grayscale image (1504), generating a mask image (1506), and filtering the image (1508). In some embodiments, e.g., in the case of a smart multifunction wheelchair that is also equipped automated alignment function, these steps may be performed as part of the automated alignment of the wheelchair to the toilet (e.g., as part of process 1300). In such embodiments, one or more of the mask images (e.g., 1405) obtained via process 1300 may be used by the toilet seat height estimation process. The filtering step 1508, and similarly step 1310 of process 1300, may involve removing unwanted objects from the mask image. In some embodiments, an assumption about the shape of the target object is made, e.g., assuming that the object of interest elongated (length larger than width). Smaller blobs or noise in the image that cannot represent the toilet (e.g., due to size) may also be filtered out of the mask image.

The process 1500 further includes detecting the vertical edges of the toilet, as shown at block 1510, and determining the location of maximum distance between the vertical edges, as shown at block 1512. To obtain the vertical (i.e., left and right) edges of the object of interest (i.e. the toilet) in the image, a first derivative filter may be applied to the filtered mask image (e.g., images in column 1605) in the vertical direction. This step (e.g., at block 1510) generates continuous edges in the left and right regions of the toilet as shown in column 1607 in FIG. 16. Then, the distance between the left edge and the right edge of the image can be extracted. The maximum distance between the left and right edges represents the top of the generally circular part of the toilet bowl (i.e. the rim of the toilet bowl) and corresponds to the approximate radius (see column 1609) of the generally circular part (or rim) of the toilet bowl. The location of the two points at which the distance between the left and right edges is maximum is identified and used in the triangulation algorithm described below to estimate the toilet seat height.

The process for estimating the approximate radius of the top generally circular portion of the toilet (i.e. the toilet bowl rim) and was tested at different camera heights, as shown in FIG. 16. In FIG. 16, the first column 1601 shows five examples (rows a-e) of images captured at different camera heights. The second column 1603 specifies the height of the camera associated with each image, while the third column 1605 shows the mask image associated with or generated from the respective image in column 1601. The fourth column 1607 shows the vertical edges of the seat extracted by the process 1500, and the fifth column 1609 specifies the approximate radius of the toilet bowl rim of the toilet in each image, which corresponds to the maximum distance between the left and right vertical edges. The distance in pixels expresses a relationship between the camera height and the approximate radius of the toilet bowl rim (or toilet seat). Specifically, when the camera is at its highest point, the toilet seat is far from the camera and thus, has a smaller radius. When the seat is at its lowest point, the largest radius of the toilet seat is recorded. The process described herein was tested and shown to estimate the toilet seat height up to an accuracy of few centimeters.

A triangulation method may be used to determine the toilet seat height. 3D coordinates, including the depth, for a specific point in the image, may be triangulated if the camera is extrinsically calibrated (camera height and viewing angle are known). Referring to FIGS. 17A and 17B, an example triangulation technique may convert the object position of the image coordinates (i, j) to world coordinates (X, Y) and depth (Z), given a camera height (h) and viewing angle (θ). The latter two values may be measured only once, when installing the camera on the wheelchair. The angles (ψ) and (θ) are the pitch and yaw angles of the camera respectively from its original location, if the camera is centered at the object location. The trapezoidal zone in FIG. 17A shows the area in the field of view of the camera. This area becomes wider as the camera moves farther away (zooms out) from the target object. Equations (2)-(5) may be used to compute the world coordinates (X, Y) from the image coordinates (i, j) where θ is the viewing angle of the camera and h is the camera height, as shown in FIG. 17A. W & H are the width and height of the given image, while $FOV_V$ & $FOV_H$ are the vertical and horizontal fields of view of the camera, respectively. The depth of the field (Z) can be determined using Pythagorean addition of the X and Y distances and the camera height, where Z represents the distance of the object from the camera as shown by equation (6).

$$\psi = \theta + \left(\frac{H}{2} + j\right) \times \left(\frac{FOV_V}{H}\right) \quad \text{(equation 2)}$$

$$\phi = \left(i - \frac{W}{2}\right) \times \left(\frac{FOV_H}{W}\right) \quad \text{(equation 3)}$$

$$Y = h \times \tan(\psi) \quad \text{(equation 4)}$$

$$X = h \times \tan(\psi) \times \tan(\phi) \quad \text{(equation 5)}$$

$$Z = \sqrt{X^2 + Y^2 + h^2} \quad \text{(equation 6)}$$

Assuming that the ground plane as at the level of the toilet seat, a relative camera height (dH) can be computed, using equation (7), given a known distance in the new ground plane, which is the radius of the generally circular opening of the toilet seat, obtained at block 1512 of process 1500. For reference, the radius of a toilet bowl rim with a generally round bowl is approximately 41.9 cm and approximately 47 cm for elongated ones. Then, and referring also to FIG. 17B, the toilet seat height can be computed by taking the difference of the actual and relative camera height as illustrated by equation (8).

$$dH = \frac{R}{\sqrt{(\tan(\psi_1) - \tan(\psi_2))^2 + (\tan(\psi_1) \times \tan(\phi_1) - \tan(\psi_2) \times \tan(\phi_2))^2}} \quad \text{(equation 7)}$$

Toilet Seat Height = Camera Height − dH   (equation 8)

While an exemplary technique is described above for estimating the toilet seat height by the electronic controller of a multifunction wheelchair, a different method may be used in other embodiments. For a real-world device, practicability, reliability, and cost are important matters. A simple but stable mechanism may be best suited for such practical, reliable, and affordable solution. In consideration of these factors, a prototype multifunctional wheelchair was built and tested, in which the frame was configured, in accordance with examples herein, to enable the seat to be translated vertically, so the wheelchair can be backed, in some cases automatically positioned, over a toilet. In the prototype tested, while translating vertically, the seat remains substantially in the same horizontal position with respect to the base of the wheelchair (i.e. the wheels which contact the ground) for improved stability (e.g., reduce the risk of tipping over of the wheelchair). The position of the centerline of gravity relative to the center of mass of the wheelchair is an important consideration to prevent the wheelchair from tipping or falling over during the height transformation. As such, existing solutions that implement a horizontally-moving mechanism for positioning the seat over a toilet may not be desirable and new solutions, such as described herein, may be needed.

A control system (e.g., controller 1110) of a prototype multifunction wheelchair was built and tested. In the prototype system, the controller was implemented by a microcontroller that includes a voice recognition module (e.g., Arduino Mega 2560 R3). The lift assembly of the transformation mechanism of a prototype multifunction wheelchair was implemented by two electric linear actuators. Since the linear actuators used require a level of supply current that cannot be sent by the microcontroller use, in the prototype the microcontroller sends control signals to the electric linear actuators via a motor driver, which relays the high current power to the electric linear actuators. In the prototype, the seat closure was also powered by an electric linear actuator, which may be driven by a separate motor drive, responsive to control by the microcontroller. In the prototype system, the wheel motors were implemented by light duty electric motors (e.g., hub motors), although a relay may still be used to pass the signal from the microcontroller to the wheel motor(s) on a higher current circuit. The power source used in the prototype system to power the electrical linear actuators and the wheel motors was a 24V, 7 A rechargeable battery. In the prototype system, the distance/height sensor (s) were ultrasound sensors, and the camera unit (e.g., camera X) in the prototype system was a CMUcam4 (Carnegie Mellon University, Pittsburgh), which uses the Parallax PBX32A processor and the Omni Vision 9665 CMOS RGB camera with a resolution of 640×480 pixels. CMUcam4 has onboard processing capability of 160×120 images for detecting color blobs, statistical analysis, and histogram and segmentation of images into two regions (thresholding). In the prototype system, the camera was connected to the Arduino microcontroller board using serial communication.

A prototype system was built for testing by cutting the frame of an existing wheelchair, at a location near the seat, and inserting a solid carbon steel sliding rod into each vertical frame to allow the wheelchair's seat and upper part of the frame to be lifted independently from the grounded lower assembly. During lifting, the wheels may be locked to prevent potential rolling. To identify and implement an affordable and reliable lifting mechanism for this purpose, various systems were studied, including general-duty electric linear actuators, portable electric car jack systems, and high-capacity hydraulic cylinders. A portable electric car jack system was chosen because of its low operating voltage, low cost ($50), compact built-in motor design, and proven reliability with high capacity (Pilot Automotive, Bully Q-HY-1500L, 12V, 4000 lbs. capacity, Industry, CA). This system is also relatively easy to be implemented into a microcontroller system.

The prototype system was tested for its ability to lift the wheelchair seat smoothly and safely to the required height according to the information about the environment provided by the control system. In two test scenarios, i.e. with no additional (user) load and with an 85 kg user seated in the seat, the battery was able to power the two electrical jacks and the average time taken to achieve a target displacement of about 10 cm, was about 26 s in either direction (up or down). Each motor controller or driver of the prototype system includes four transistors, 2N3055, on the H-bridge for two-way operation of the motor to move the jack up and down. A manual controller was included as an emergency backup switch. Four micro switches were added to the circuit as another safety feature. When each jack reaches the upper and lower limit of travel, the circuit is opened. Owing to its compact size and reliability, a sealed lead-acid battery (12V-10 Ah, Terminator, Taiwan) was selected and tested to 7 cm stroke in either direction (up or down) with two test conditions: with no-load and with patient weighing 85 kg.

To incorporate semi-autonomous behavior into the prototype system, a command-and-decision architecture was built onto the Arduino microcontroller (Mega 2560 R3). A suitable and inexpensive voice recognition user interface was developed using a commercial speech recognition module. Various suitable speech recognition modules exist, such as the EasyVR shield 2.0 module (ROBOTECH SRL, Pisa, Italy), which was chosen for the prototype system because it includes a built-in speaker set and provides a variety of already built-in powerful and cost-effective speech and voice recognition capabilities. The EasyVR module was also chosen for the prototype system due to the ease of integration into all host Arduino boards. Some microphones work best at a distance of about 60 cm from the sound source, and therefore the placement of the microphone and/or the voice recognition module, if integrated therewith, is selected for optimal performance. The EasyVR commander software allows users to configure and define groups of commands that can handle speech recognition tasks. The operation of the prototype systems was tested with two Arabic voice commands, Toilet (Hammam) and Finish (Khallas). Since these commands were not in the command vocabulary in of the supported languages, the system was trained using two different user voices, yielding 80% of accuracy, 87% of sensitivity and 68% of specificity. The success rate may depend on background noise, and given the normal environment of public restrooms, appropriate background noise was included during the training. A standardized recording protocol that controls the noise level, recording distance, and the voice level, may be used to improve the voice command interface for use in regular public restroom. In other implementations, background noise may be reduced using known techniques. In various examples, the user inputs may be provided by any combination of pressing a button, flipping or toggling a switch, giving a voice command, EEG reading, a wearable garment equipped with sensors, or another suitable interface between the user and the control system.

The prototype was also used to test the accuracy of the height estimation process, showing good accuracy, with a pseudo-linear relationship between changes in the estimated toilet seat height and camera height, thus demonstrating that the estimation algorithm is substantially independent of the height of the camera with respect to the ground and toilet.

In systems equipped with motorized wheels, the system actuates the wheel motors to back the wheelchair's centerline toward the image sensor's reading of the center of the toilet while also monitoring the wheelchair's distance from the toilet and the toilet height using the distance (e.g., ultrasound, optical, RF-based, or other) sensors. The wheelchair stops near toilet to height adjustment, if needed for proper clearance over the toilet bowl, and then the wheelchair back over the toilet and the seat closure is toggled open to expose the opening in the seat. The above steps are completed in a reverse arrangement to move the wheelchair and user away from the toilet. In some embodiments, while the multifunction wheelchair may be configured to provide motorized rearward movement for properly positioning the wheelchair with respect to the toilet, forward movement of the wheelchair away from the toilet may be performed manually by the user.

From the foregoing it will be appreciated that, although specific examples have been described herein for purposes of illustration, various modifications may be made while remaining with the scope of the claimed technology. One of ordinary skill in the art will appreciate that the above examples are illustrative and non-limiting in nature. Other variations may be employed, including different types of components or combinations of components for implementing the same or similar functions as one or more of the circuit elements shown herein.

What is claimed is:
1. A wheelchair comprising:
a frame supporting a seat and defining a cavity below the seat that has a sufficient width to accommodate a toilet, wherein the frame comprises a left frame portion and a right frame portion on opposite sides of the cavity, each of the left and right frame portions comprising a lower frame assembly and an upper frame assembly movably coupled to the lower frame assembly, the upper frame assemblies supporting the seat such that it extends over the cavity and is movable relative to the lower frame assemblies, and wherein the seat includes an opening extending from a top side of the seat to a bottom side of the seat;
a lift assembly configured to raise and lower the upper frame assemblies and the seat relative to the lower frame assemblies, wherein the lift assembly is arranged on the frame such that it does not extend into the cavity and wherein the lift assembly is configured to substantially maintain the relative horizontal position of the seat with respect to the lower frame assemblies during the raising and lowering;
a camera coupled to the frame to face away from a rear side of the frame; and
a controller communicatively coupled to the lift assembly and the camera, wherein the controller comprises a processor configured to receive an image of the toilet and to determine a seat height of the toilet from the image, and wherein the controller is configured to command the lift assembly to raise the upper frame assemblies and the seat to a position in which the seat is above the seat height of the toilet determined from the image, wherein the seat further comprises a closure mechanism operatively associated with the opening, the closure mechanism comprising a cover configured to support a portion of a user seated in the wheelchair when the closure mechanism is in closed position, and
wherein the closure mechanism is automatically actuated to an open position by operation of the lift assembly to raise the seat.

2. The wheelchair of claim 1, wherein the lift assembly is configured to raise the seat vertically without moving the seat horizontally relative to the lower frame assemblies.

3. The wheelchair of claim 2, wherein the lift assembly includes a first lift mechanism coupled to the left frame portion and configured to lift the upper frame assembly of the left frame portion, and a second lift mechanism coupled to the right frame portion and configured to lift the upper frame assembly of the right frame portion, and wherein the controller is configured to command the first and second lift mechanisms to raise the upper frame assembly of the left frame portion in synchrony with the upper frame assembly of the right frame portion.

4. The wheelchair of claim 1, wherein the closure mechanism is mechanically automatically actuated to the open position by the operation of the lift assembly to raise the seat.

5. The wheelchair of claim 1, wherein the processor is configured to determine the seat height of the toilet by:
estimating a location of a rim of a toilet bowl of the toilet within the image; and
determining a height of the camera above the rim of the toilet bowl based, at least in part, on the estimated location of the rim of the toilet bowl.

6. The wheelchair of claim 5, wherein the processor is configured to generate a binary mask image from the image of the toilet and use the binary mask image for estimating the location of the rim of the toilet bowl.

7. The wheelchair of claim 6, wherein the processor is further configured to use the binary mask image to steer the wheelchair into a position in which the wheelchair is substantially centered with respect to the toilet bowl.

8. The wheelchair of claim 1, further comprising a user input configured to receive user commands for operating the lift assembly.

9. The wheelchair of claim 8, wherein the user input comprises a voice recognition module communicatively coupled to the processor, wherein the voice recognition module is configured to recognize a predetermined command for initiating raising or lowering of the seat.

10. The wheelchair of claim 1, wherein the wheelchair is a folding wheelchair and wherein the seat is bendable.

11. A wheelchair comprising:
a frame supporting a seat and defining a cavity below the seat that has a sufficient width to accommodate a toilet, wherein the frame comprises a left frame portion and a right frame portion on opposite sides of the cavity, each of the left and right frame portions comprising a lower frame assembly and an upper frame assembly movably coupled to the lower frame assembly, the upper frame assemblies supporting the seat such that it extends over the cavity and is movable relative to the lower fram assemblies, and wherein the seat includes an opening extending from the top side of the seat to a bottom side of the seat;
a lift assembly configured to raise and lower the upper frame assemblies and the seat relative to the lower frame assemblies, wherein the lift assembly is arranged on the frame such that it does not extend into the cavity and whrein the lift assembly is configured to substantially maintain the relative horizontal position of the seat with respect to the lower fram assemblies during the raising and lowering:
a camera coupled to the fram to face away from a rear side of the frame; and
controller commmunicatively coupled to the lift assembly and the camera, wherein the controller comprises a processor configured to recieve an image of the toilet and to determine a seat height of the toilet from the image, and wherein the controller is configured to command the lift assembly to raise the upper frame assemblies and the seat to a position in which the seat is above the seat height of the toilet determined from the image,
wherein the wheelchair is a folding wheelchair and wherein the seat is bendable, and whrrein the frame further comprises:
a left seat rail proximate the left frame portion and supporting a left side of the seat;
a right seat rail proximate the right frame portion and supporting a right side of the seat;
a cross-bar linkage comprising:
a first link having a first end coupled to a front end of the left seat rail and a second end operatively associated with a first lift mechanism of the lift assembly; and
a second link having a first end coupled to a front end of the right seat rail and a second end operatively associated with a second lift mechanism of the lift assembly, wherein the second link is pivotally coupled to the first link at a location between the first and second ends of the second link.

12. The wheelchair of claim 11, wherein the lift assembly is configured to raise the seat vertically without moving the seat horizontally relative to the lower frame assemblies.

13. The wheelchair of claim 12, wherein the lift assembly includes a first lift mechanism coupled to the left frame portion and configured to lift the upper frame assembly of the left frame portion, and a second lift mechanism coupled to the right frame portion and configured to lift the upper frame assembly of the right frame portion, and wherein the controller is configured to command the first and second lift mechanisms to raise the upper frame assembly of the left frame portion in synchrony with the upper frame assembly of the right frame portion.

14. The wheelchair of claim 11, wherein the seat further comprises a closure mechanism operatively associated with the opening, the closure mechanism comprising a cover configured to support a portion of a user seated in the wheelchair when the closure mechanism is in a closed position.

15. The wheelchair of claim 14, wherein the closure mechanism is automatically actuated to an open position by operation of the lift assembly to raise the seat.

16. The wheelchair of claim 15, wherein the closure mechanism is mechanically automatically actuated to the open position by the operation of the lift assembly to raise the seat.

17. The wheelchair of claim 11, wherein the processor is configured to determine the seat height of the toilet by:
estimating a location of a rim of a toilet bowl of the toilet within the image; and
determining a height of the camera above the rim of the toilet bowl based, at least in part, on the estimated location of the rim of the toilet bowl.

18. The wheelchair of claim 17, wherein the processor is configured to generate a binary mask image from the image of the toilet and use the binary mask image for estimating the location of the rim of the toilet bowl.

19. The wheelchair of claim 18, wherein the processor is further configured to use the binary mask image to steer the wheelchair into a position in which the wheelchair is substantially centered with respect to the toilet bowl.

20. The wheelchair of claim 11, further comprising a user input configured to receive user commands for operating the lift assembly.

21. The wheelchair of claim 20, wherein the user input comprises a voice recognition module communicatively coupled to the processor, wherein the voice recognition module is configured to recognize a predetermined command for initiating raising or lowering of the seat.

* * * * *